United States Patent [19]

Iwase

[11] Patent Number: 5,226,093
[45] Date of Patent: Jul. 6, 1993

[54] MOTION VECTOR DETECTION AND BAND COMPRESSION APPARATUS

[75] Inventor: Seiichiro Iwase, Kanagawa, Japan

[73] Assignee: Sony Corporation, Tokyo, Japan

[21] Appl. No.: 799,308

[22] Filed: Nov. 27, 1991

[30] Foreign Application Priority Data

Nov. 30, 1990 [JP] Japan .................. 2-338492

[51] Int. Cl.[5] .................................. G06K 9/36
[52] U.S. Cl. ........................ 382/41; 358/105; 382/21; 382/56; 395/94
[58] Field of Search .............. 382/41, 54, 59, 21, 382/56, 48; 358/105, 103, 108; 395/80, 94

[56] References Cited

U.S. PATENT DOCUMENTS

| | | | |
|---|---|---|---|
| 5,089,887 | 2/1992 | Robert et al. | 358/105 |
| 5,097,327 | 3/1992 | Hasebe | 358/105 |
| 5,099,323 | 3/1992 | Morimura et al. | 358/105 |
| 5,105,271 | 4/1992 | Niihara | 358/105 |
| 5,113,255 | 5/1992 | Nagata et al. | 358/105 |
| 5,126,841 | 6/1992 | Tanaka et al. | 358/105 |

*Primary Examiner*—Joseph Mancuso
*Attorney, Agent, or Firm*—William S. Frommer; Alvin Sinderbrand

[57] ABSTRACT

A motion vector detection apparatus comprises; delay circuit for receiving first picture data and for outputting a particular detection range of picture data, block comparison circuit for receiving second picture data with a particular time difference from the first picture data and picture data from the delay circuit and for detecting a difference therebetween for each block of ($P \times Q$) picture elements, and determination circuit for determining the matching degree of a picture from the output signal produced by the block comparison circuit, wherein the delay circuit comprises scanning conversion circuit for converting input picture data from conventional horizontal scanning into intra-block scanning and a plurality of shift registers for receiving the first picture data with a delay of one frame, wherein the plurality of shift registers are characterized in that both a first block structuring ($P \times Q$) picture elements which are earlier than a particular reference tap of the plurality of shift registers and a second block which deviates by i picture elements horizontally and by j picture elements vertically from the first block are set so that when the first block does not deviate from the second block, a tap with a delay which is equal to the difference between each picture element of the second block and the reference tap is selected, the second picture data being obtained from the selected tap.

6 Claims, 28 Drawing Sheets

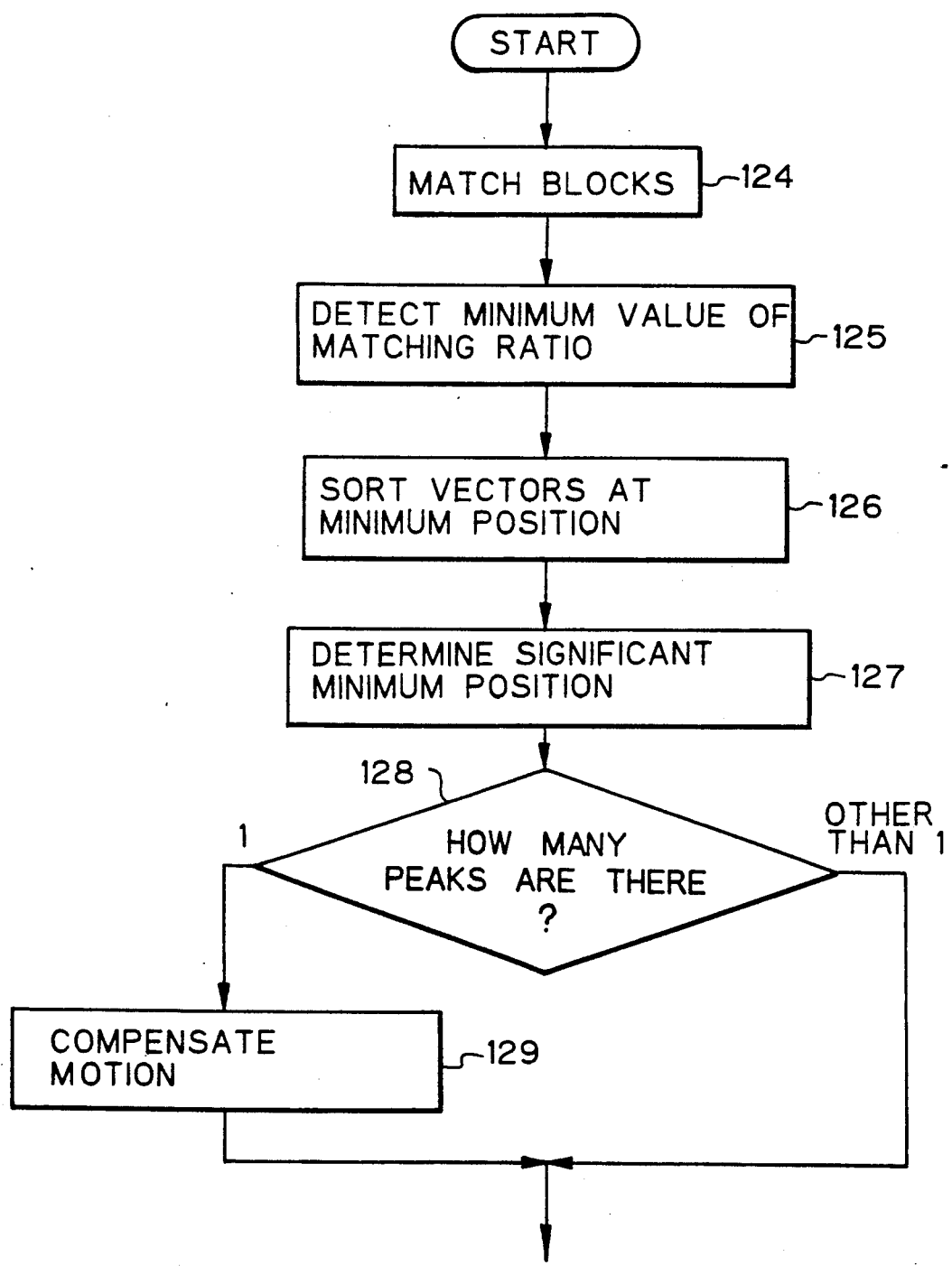

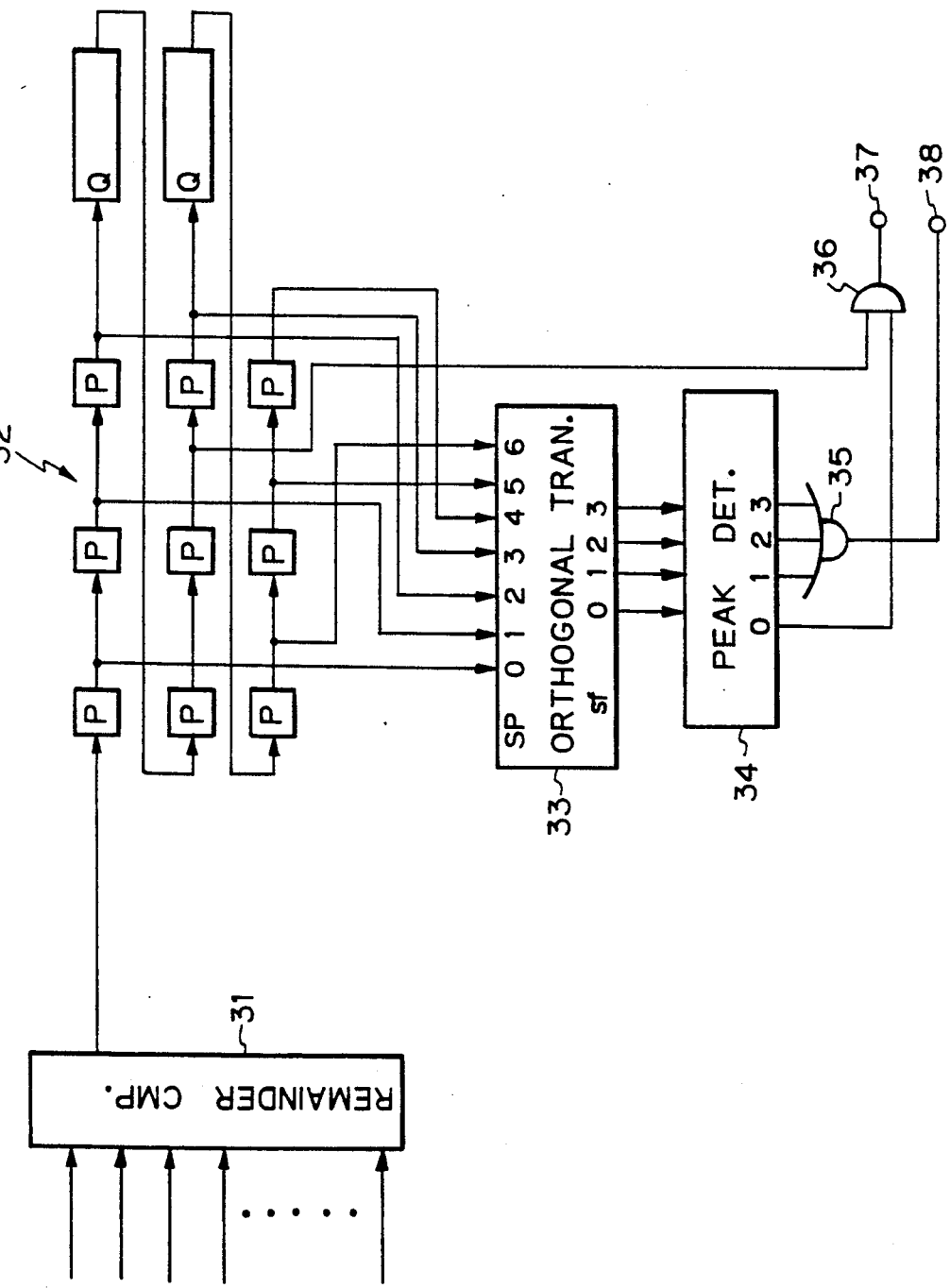

| -6.5 | -5.5 | -4.5 | -3.5 | -2.5 |
|------|------|------|------|------|
| -6.4 | -5.4 | -4.4 | -3.4 | -2.4 |
| -6.3 | -5.3 | -4.3 | -3.3 | -2.3 |
| -6.2 | -5.2 | -4.2 | -3.2 | -2.2 |
| -6.1 | -5.1 | -4.1 | -3.1 | -2.1 |

} 68

} 69

| -6.4 | -5.4 | -4.4 | -3.4 | -2.4 |
|------|------|------|------|------|
| -6.3 | -5.3 | -4.3 | -3.3 | -2.3 |
| -6.2 | -5.2 | -4.2 | -3.2 | -2.2 |
| -6.1 | -5.1 | -4.1 | -3.1 | -2.1 |
| -6.0 | -5.0 | -4.0 | -3.0 | -2.0 |

} 68

69

| -5.5 | -4.5 | -3.5 | -2.5 | -1.5 |
|------|------|------|------|------|
| -5.4 | -4.4 | -3.4 | -2.4 | -1.4 |
| -5.3 | -4.3 | -3.3 | -2.3 | -1.3 |
| -5.2 | -4.2 | -3.2 | -2.2 | -1.2 |
| -5.1 | -4.1 | -3.1 | -2.1 | -1.1 |

MOTION VECTOR DETECTION AND BAND COMPRESSION APPARATUS

BACKGROUND OF THE INVENTION

1. Field of the Invention

The invention relates to a motion vector detection apparatus, and a band compression apparatus being a combination of motion compensation and an inter-frame encoding subsystems.

2. Description of the Prior Art

First, a detection method of motion vectors will be described. Now, assume that one picture (a frame which is not interlaced) is composed of H picture elements in the horizontal direction and V lines in the vertical direction as shown in FIG. 1. In addition, assume that the screen of the picture is segmented into blocks of P picture elements by Q lines. FIG. 2 shows one of these blocks. The figure shows an example of P=5 and Q=5. In the figure, reference letter C represents the position of the center picture element of the block.

FIG. 3 shows the relation of positions between a block where C is the center picture element and another block where C' is the center picture element. When the former is a block to be considered as a current frame, another block in the preceding frame which matches the picture of the current frame is at the position with a center of C'. FIG. 3A shows a motion vector where the center position of the picture is moved for +1 picture element in the horizontal direction and for +1 line in the vertical direction. FIG. 3B shows a motion vector where the center position of the picture is moved for +3 picture elements in the horizontal direction and for +3 lines in the vertical direction. FIG. 3C shows a motion vector where the center position of the picture is moved for +2 picture elements in the horizontal direction and for −1 line in the vertical direction. Generally, a motion vector can be obtained for each block of the current frame.

When the range of detecting a motion vector is ±S picture elements in the horizontal direction and for ±T lines in the vertical direction, a particular block of the current frame should be compared with various blocks in the preceding frame where C' is moved from C, which is the center of the current frame, for ±S in the horizontal direction and for ±T in the vertical direction. FIG. 4 represents that when the position of the center C of a particular block of the current frame is R, it should be compared with blocks of (2S+1)×(2T+1) of the preceding frame. In other words, all blocks of the preceding frame where C' is present as shown in FIG. 4 should be compared. FIG. 4 shows an example of S=4 and T=3.

Now, an example of the case where P=5, Q=5, S=4, and T=3 will be described.

When a particular block to be considered in the current frame is at positions of 5 picture elements by 5 lines at the center portion shown in FIG. 5, all blocks made of 5 picture elements by 5 lines in the box represented with the solid line made of (P+2S) picture elements by (Q+2T) shown in FIG. 5 including ±S picture elements in the horizontal direction and ±T lines in the vertical direction with the center at the same position as the preceding frame should be compared.

A motion vector may be detected by omitting part of the blocks to be considered so as to simplify the operation. In other words, in the above mentioned example, all relations of positions for ±S picture elements in the horizontal direction and for ±T lines in the vertical direction are compared. However, some combinations of comparisons may be omitted. Nevertheless, in the following, all combinations are compared so as to simplify the description.

FIG. 6 is a conceptual block diagram showing a construction for detecting a motion vector. Data a which is supplied from an input terminal 101 is picture data of a current frame. Data b is picture data of a just preceding frame which is delayed for one frame by a frame memory 102. The data b of the preceding frame becomes data with various relations of positions as shown in FIG. 3 by a delay portion 103. Each data with various relations of positions is compared with the data a. A block comparison portion 104 outputs a matching ratio of the picture for each position shown in FIG. 3 that data b might occupy. A determination portion 105 compares the matching ratios and outputs a most suitable deviation amount, namely a motion vector to an output terminal 106.

The hardware for detecting the motion vector shown in FIG. 6 requires memories with large capacity for the delay portion 103 and the block comparison portion 104 along with the frame memory 102. When a part of the comparisons is not omitted, the size of the calculation portion of the block comparison portion 104 becomes large. In addition, the size of the determination portion 105 also becomes large depending on the method used to determine which comparisons should be omitted. Thus, the hardware for detecting the motion vector takes a large part of the system which uses these motion vectors.

Although software for detecting motion vectors has been proposed (refer to Japanese Patent Laid-open Publication No. SHO 61-105176), due to restriction of the process speed of the software, it is necessary to use much simplified comparisons and determination methods. Thus, the accuracy of motion vectors being detected disadvantageously becomes low.

The present invention relates to decreasing the amount of hardware for the delay portion 103 and the block comparison portion 104 except for the determination portion 105 shown in FIG. 6, in particular, relates to decreasing the amount of hardware for the delay portion 103.

FIGS. 7 and 8 show a first prior art arrangement. FIG. 7 shows portions equivalent to the frame memory 102 and the delay portion 103 shown in FIG. 6.

In FIG. 7, reference letter F is the frame memory 102 for delaying input data by one frame. Reference letter H is a delay circuit for delaying one horizontal scanning line. Small boxes without letters are delay circuits for delaying one picture element, namely, registers. Portions of rectangular boxes denoted by (H−9) are delay circuits for delaying picture elements for one line minus 9 picture elements. One line is delayed by one rectangular box denoted by (H−9) and nine small boxes.

The input data a of the current frame is delayed for 3 lines and 5 picture elements by a delay circuit 107 which is surrounded with a dot line and becomes the center position R of the block. The resultant data is obtained from an output terminal 108.

Since the data b has a delay of one frame relative to the data a, the positions of the picture elements of the data a is the same as those of the data b. In addition, as shown in FIG. 7, nine stages of registers and one (H−9) delay circuit are connected in series, a tap C (0, 0)

which has a delay of 3 lines and 5 picture elements relative to the data b has a delay of one frame with reference to R.

At the input terminal 101 shown in FIG. 7, a data sequence which has been horizontally scanned is input like a conventional picture signal. When the data sequence is stopped at a particular timing, picture elements in the vicinity of the preceding frame relative to the picture element of R of the current frame are obtained at (C (i, j); (where i=−Sn+S, j=−Tn+T) as shown in FIG. 4. For example, at C (1, 0), data which is older by one picture element in the horizontal direction than C (0, 0) and (R) is obtained. In other words, the data of the picture element on the left of R on the display screen shown in FIG. 4 is obtained. To obtain a motion vector, by using each tap shown in {C (i, j)} (where i=−Sn+S, j=−Tn+T), data at each deviated position shown in FIG. 4 is obtained. The block comparison portion 104 compares each tap with R, calculates the amount of difference therebetween, or matching degree (of two pictures), and obtains a result for each (i, j). Thereafter, the determination portion 105 determines the results and selects a proper motion vector (i, j). In a particular situation, i and j may be determined with real numbers rather than integer numbers.

Then, the matching ratio for each (i, j) is obtained in a construction as shown in FIG. 8. The circuit shown in FIG. 8 is required for each C (i, j). In other words, since no part of block comparisons are omitted, $(2S+1)\times(2T+1)$ circuits shown in FIG. 8 are required.

In FIG. 8, blocks are compared for each C (i, j) as shown in FIG. 3. From R, each picture element of the block at the center portion shown in FIG. 5 is obtained. On the other hand, from the tap C (i, j), each picture element of the block of the preceding frame which is deviated for i picture elements in the horizontal direction and for j lines in the vertical direction is obtained. A subtraction circuit 109 obtains the difference of each corresponding position of both the blocks. An absolute value calculation circuit 110 calculates the absolute value of the difference. An addition circuit 111 and a memory 112 cumulate the difference for all picture elements constructing one block, namely, for P×Q. The cumulated output is the matching degree for (i, j).

In the above mentioned prior art, an example where the absolute value (ABS) of the difference was calculated was described. However, it is also possible to use the square of the difference.

The description of the above mentioned prior art has not yet been completed. That is, although the input shown in FIG. 7 has been horizontally scanned, the same data except that it is shifted in terms of time is output to R and each tap of C (i, j). Thus, data cannot be compared block by block as shown in FIG. 3. However, this problem can be solved by disposing the memory 112 in the accumulator shown in FIG. 8.

At both the inputs R and C (i, j) shown in FIG. 8, each picture element according to blocks in the combinations shown in FIG. 3 should be obtained in succession. However, since the input shown in FIG. 3 has been horizontally scanned, each picture element of the first line of the block is input to R and C (i, j). Thereafter, data for comparing the adjacent block rather than each picture element of the next line is input to R and C (i, j). After H/P blocks which are horizontally disposed as shown in FIG. 1, each picture element of the second line of the former block is compared. Thus, when the cumulative operation for obtaining the matching degree is performed, it is possible to skip the operation for each line on the midway and perform the cumulative operation for comparing the adjacent block. To do that, the memory 112 for storing H/P words or more is provided as a cumulation memory.

FIG. 9 is a schematic diagram describing the operation of the memory 112. In the figure, it is assumed that n=H/P. In the figure bk (where k=0 to n−1) is the content of each address at which data on the midway is stored.

In FIG. 8, reference numeral 113 is an address generation circuit. The address generation circuit 113 increments the address by 1 at intervals of P cycles which are equivalent to the number of horizontal picture elements included in one block and resets the address to "0" after one horizontal scanning is completed. Thus, the address generation circuit 113 can control a memory address assignment circuit as shown in FIG. 9.

In addition, the cumulative operation for matching blocks should be reset at intervals of H/P blocks disposed in the horizontal direction of the screen. This reset operation can be performed by setting all b0 to bn−1 of the memory 111 to "0". As another method, it is also possible to construct the address generation circuit 113 so that the address Z which stores "0" is selected in the memory when the first picture element is cumulated in comparing each block.

In FIG. 7, to obtain data at the position R, a delay of (3H+5) is provided. However, it is possible to omit such a delay by providing the frame delay (F) with a delay circuit of (F=−3H−5).

As shown in FIG. 9, the cumulation memory 112 has words of n =H/P so as to obtain a motion vector for each block shown in FIG. 1. Thus, when one motion vector is obtained, for each frame, the number of words that the cumulation memory 112 has becomes one word. In other words, the number of words that the cumulation memory 112 should have depends on in what condition motion vectors are obtained.

Although the circuits shown in FIGS. 7 and 8 can be accomplished and controlled with relative ease, their sizes disadvantageously become large.

With respect to hardware, the frame memory 102 and the calculation circuits shown in FIG. 8 (reference numerals 109, 110, and 111) for comparing blocks are theoretically essential. However, the large number of delay circuits (H−9) and the memories 112 having H/P words for each cumulative operation are required constructionally, not essentially. Thus, it is preferable to omit such circuits by using another construction method.

The delay circuits and the memories are required since input data has been horizontally scanned. In other words, the memories are required to compare the blocks as shown in FIG. 3 in accordance with the input which has been horizontally scanned as shown in FIG. 10A.

To prevent that, a scanning method in accordance with each block, where the input data is a data sequence which has been horizontally scanned for each block can be used.

Thus, a second prior art arrangement which can be considered is a method of comparing blocks in such a manner that an input data sequence a is formed of data which has been scanned for each block as shown in FIG. 10B, while a data sequence b with a delay of one frame thereagainst is scanned in a wide area when the block of the data a is at the center portion shown in FIG. 5.

In this case, since the amount of data in the input data sequence a differs from that of the delayed data sequence, the following operation is required. In other words, the the number of picture elements of one block to be compared for the data sequence a is (P×Q), that for the data sequence b is {(2S P)×(2T+Q)}. Thus, the clock frequency of the data sequence b should be correspondingly increased so that the data sequence a and the data sequence b take place in accordance with timing charts shown in FIG. 11. In other words, when the input data is scanned as shown in FIG. 10B, the data sequence a takes place in accordance with the timing chart as shown in FIG. 10A. However, in this case, by increasing the rate of the data sequence a, a timing as shown in FIG. 11B is used. The ratio of the block frequencies between FIGS. 11A and 11B is represented by (2S+P)×(2T+Q)/P×Q. Thus, there are time slots in which no data takes place. On the other hand, the data sequence b takes place as shown in FIG. 11C.

In FIG. 12, a scanning transformation circuit 115 is a circuit for transforming the input data sequence a into a data sequence as shown in FIG. 11B. A scanning sequence transformation circuit 116 is a circuit for transforming a data sequence b from a frame memory 102' into a data sequence b' as shown in FIG. 11C. The data sequence b' to which the scanning sequence b has been transformed is sent to a delay portion which is composed of (2S+1)×(2T+1) stages of shift registers, which are the same as those shown in FIG. 7. Thereafter, in the construction shown in FIG. 8, blocks are compared. According to this second prior art arrangement, the (H−9) delay circuits used in the first prior art arrangement (FIG. 7) are unnecessary. Thus, the number of words that the memory of the accumulator shown in FIG. 8 must store becomes one word.

However, as shown in FIG. 11C, since the data sequence b' has (P+2S) picture elements in the horizontal direction, it has 2S extra picture elements in comparison with the data sequence b. Likewise, the data sequence b' has 2T extra lines in the vertical direction in comparison with the data sequence. Thus, it is necessary to stop the cumulative operation for extra picture elements.

The designation F-32 denoted by 102' in FIG. 12 has a delay which is smaller than the frame delay by 32 picture elements. Thus, the frame memory 102' sets the timing difference between R and C (0, 0) to one frame.

When the scanning sequence of the television signal is transformed into the scanning sequence for every (P×Q) blocks, the scanning sequence shown in FIG. 10A is transformed into the scanning sequence of every block shown in FIG. 10B. To do that, a line memory with the vertical length of the blocks is required at least. This memory is not small in terms of hardware. However, since the scanning operation as shown in FIG. 10B is required for various purposes such as a band compression which requires the detection of a motion vector, the scanning sequence transformation of P×Q as shown in FIG. 11A does not always become a burden to the apparatus. On the other hand, since the data sequence a' as shown in FIG. 11B and the scanning sequence transformation of (P+2S)×(Q+2T) as shown in FIG. 11C are not used for other processes, they become a burden to the apparatus.

More accurately speaking, in the scanning sequence transformation of (P+2S)×(Q+2T), the input data is scanned as shown in FIG. 10B with overlaps of 2S picture elements in the horizontal direction and of 2T lines in the vertical direction.

In this second prior art arrangement, the construction of the (P+2S)×(Q+2T) stages of shift registers is simpler than that of the (H−9) delay circuit group in terms of hardware. Thus, the delay portion of the second prior art is simpler to implement than that of the first prior art arrangement. In addition, in the second prior art arrangement, a simple register can be used for the memory of the accumulator shown in FIG. 8. Thus, a significant effect can be obtained. On the other hand, in the second prior art arrangement, the scanning sequence transformations of P×Q and (P+2S)×(Q+2T) are required. Thus, in the second prior art, memories more than the (H−9) delay circuit group shown in FIG. 7 are required. In addition, after the scanning sequence transformation is performed, the data rate is increased by (P+2S)×(Q+2T)/P×Q times. Moreover, the cumulative operation should be controlled.

Furthermore, motion vectors which are detected are compensated in various picture processes.

In other words, in the case of a process which cannot be performed with only one frame or one field, when the motion of a motion picture on the screen is not considered, a process comparison between frames or fields cannot be performed. Practically, the compensation of a motion vector is required for the band compression of pictures, the Y/C separation, and non-interlace operation.

In the compensation of a motion vector, two frames (or fields) are compared so as to obtain a motion vector, that is, an indicator of the deviation of both pictures. Thereafter, one of the frames (or fields) is moved by the amount of the deviation so that both pictures overlap.

Normally, a motion picture involves not only a parallel movement, but also a rotation, an enlargement, and a reduction. However, in the present picture processing technologies, only the component of the parallel movement is detected and considered in producing a motion vector. In one motion vector detection method which has been widely used, a screen is divided into small square blocks and then a motion vector is obtained for each block. With respect to problems in detecting the motion vectors and compensating them, the following items should be considered.

(1) As a result of the block matching operation, when the function of the matching ratio has many minimum values, how should they be determined?

(2) Since only one vector can be obtained for each block, although the case where there are two or more motions is out of the question, even in a simple motion, a block at a contour portion of the motion and a block including an isolated small motion subject cannot be considered.

For example, when an automobile moves to the right as shown in FIG. 14, on this screen:

(1) When the block matching operations are performed for the blocks C - c and C - d, the motion of the automobile can be obtained.

(2) The blocks B - b, B - c, B - d, B - e, C - b, C - e, D - b, D - c, D - d, and D - e are the contour of the motion subject. Since one block has two motion vectors, the determination of motion vectors is troublesome.

(3) The remaining blocks other than those in (1) and (2) are still. In these blocks, motion vectors can be obtained.

Conventionally, in the determination portion 105 shown in FIG. 6, a motion vector is detected in a procedure as shown in FIG. 16. With this motion vector, the motion is compensated. As shown in FIG. 13, the determination portion 105 comprises a remainder comparison circuit 120, to which a remainder for each deviated position after comparison of blocks is sent (i.e. the non-zero difference between the compared blocks), and a comparison and noise removal circuit 121. The remainder comparison circuit 120 supplies the position and the amount of the most minimum value of the remainder, that of the second minimum value of the remainder, and those of the third minimum value of the remainder to the comparison and noise removal circuit 121. The comparison and noise removal circuit 121 removes data which is determined to be noise and compares the remainders. As a result, a determination signal representing the validity of the motion compensation and a motion vector are output through an AND gate 123.

In the conventional determination portion, as shown in FIG. 16, blocks are matched (step 124). Thereafter, the minimum value of the matching degree is detected (step 125). The vectors at the minimum position are sorted in the order of their matching ratio (step 126). The significant minimum position (where it is determined that a motion subject of the vector is present) is determined (step 127). The number of peaks of the minimum position is checked (step 128). When the number of peaks is 1, the motion is compensated (step 129). Otherwise, the motion is not compensated.

In the above mentioned determination procedure, many algorithms for detecting the minimum value, for sorting vectors at the minimum position in the order of their matching ratio, and for determining the significant position have been known. However, they require complicated operations in general. In other words, they require many determinations which decide the subsequent operations and are not implemented by standardized and simply repeated operations.

When the range for detecting a motion vector in matching blocks is ±S picture elements in the horizontal direction (x axis) and ±T picture elements in the vertical direction, the frame difference (field difference of the picture blocks is cumulated for the amount of each motion vector (x, y) (where x=±S and y=±T). Thus, three-dimensional data shown by contour line indication of FIG. 15 is obtained. The minimum value of the three-dimensional data is the minimum value of the matching ratio.

For example, in FIG. 15A, the minimum value is present at a vector which is such as a background in the panning of a camera or the inside of a moving subject. On the other hand, FIG. 15B shows the case of a contour of a moving subject where two minimum values (two vectors) are present.

The contour of the moving subject is for example the block D - b shown in FIG. 14, namely the block shown in FIG. 17.

The disadvantages of the conventional determination portion and motion compensation of motion vectors are as follows:

(1) The motion vector detection procedure, namely the procedure for determining the significant minimum position by using the distribution of the matching ratio obtained by the block matching operation is complicated.

(2) Since only one vector can be obtained from each block, the contour of a motion subject cannot be compensated. Hence, the contour of the motion picture being obtained tends to become blurred.

In addition, inter-frame encoding using a motion compensation has been known. The inter-frame encoding is used for band compression necessary for transmitting a picture signal. The encoding method, which is a combination of the motion compensation and the inter-frame differentiation, can be roughly accomplished in a construction as shown in FIG. 18. For the theory of operation of the illustrated circuitry, for example reference is made to the following document. ("Multidimensional Signal Processing of TV Pictures", Nuki Fuki, Nikkan-Kogyo Shinbun, PP 266-280, particularly, FIG. 7-29, page 274).

Reference numeral 132 denoted by DCT in FIG. 18 is a discrete cosine transformation circuit. Reference numeral 133 denoted by IDCT is an inverse discrete cosine transformation circuit. Reference numeral 135 is a frame memory for delaying a frame. Input data is supplied to a motion vector detection circuit 136 and a subtraction circuit 131. The subtraction circuit 131 subtracts a locally decoded output of the preceding frame from the input data. The local decoding is formed by the inverse transformation circuit 133 and an addition circuit 134. The data amount o encoded data which is generated in the discrete cosine transformation circuit 132 is compressed by an encoding such as Huffman encoding in an encoding assignment circuit 137.

In such a construction, the motion compensation of the frame memory (FM) is accomplished with a motion vector by the motion vector detection circuit 136. As was described above, the motion vector detection circuit 136 requires another frame memory along with the frame memory 135 used for the band compression unit (FIG. 18).

Thus, two frame memories are required for motion vector detection and band compression.

OBJECTS AND SUMMARY OF THE INVENTION

Therefore, an object of the present invention is to provide a motion vector detection apparatus where a delay circuit used for detecting a motion vector in a block matching scheme can be readily constructed.

Another object of the present invention is to provide a motion vector detection apparatus for detecting a motion vector by easier determination and simpler operation than prior art.

A further object of the present invention is to provide a band compression apparatus for sharing one frame memory for detecting a frame difference and for detecting a motor vector and thereby reduce the hardware scale.

A still further object of the present invention is to provide a band compression apparatus for optimizing a compression process for use of diagonal conversion encoding scheme.

According to an aspect of the invention, there is provided a motion vector detection apparatus comprising, delay circuit for receiving first picture data and for outputting a particular detection range of picture data, block comparison circuit for receiving both second picture data with a particular time difference from the first picture data and picture data from the delay and for detecting a difference between picture data from the delay circuit and the second picture data for each block formed of (P×Q) picture elements, and determination circuit for determining a matching degree of a picture in response to the output signal from the block comparison circuit, wherein the delay circuit comprises scanning conversion circuit for converting input picture data from conventional horizontal scanning into scanning within the block and a plurality of tapped shift registers for receiving the first picture data with a delay of one frame, wherein the plurality of shift registers are characterized in that both a first block formed of (P×Q) picture elements which precede a particular reference tap of the plurality of shift registers and a second block which deviates by i picture elements horizontally and by j picture elements vertically from the first block are set and that when the first block does not deviate from the second block, a tap with a delay which is equal to the difference between each picture element of the second block and the reference tap is selected, the second picture data being obtained from the selected tap.

According to another aspect of the invention, there is provided a band compression apparatus which comprises a combination of motion compensation and inter frame encoding the improvement comprising, circuit for generating a difference between input picture data and picture data delayed with a time difference of one frame, circuit for detecting a matching degree of each block of the comparison points and thereby detecting a motion vector with the highest matching degree, and circuit for selecting and encoding the difference in accordance with the detected motion vector.

The above, and other, objects, features and advantage of the present invention will become readily apparent from the following detailed description thereof which is to be read in connection with the accompanying drawings.

BRIEF DESCRIPTION OF THE DRAWING

FIG. 16 is a flow chart describing the determination portion of the conventional motion vector detection apparatus;

FIGS. 23, 24, and 25 are schematic diagrams describing the embodiment;

FIG. 33 is a block diagram describing the second embodiment according to the present invention;

DETAILED DESCRIPTION OF THE PREFERRED EMBODIMENTS

Now, with reference to the accompanying drawings, embodiments according to the present invention will be described. The embodiments which will be described are in the order of an embodiment suitable for matching blocks, an embodiment suitable for a determination portion of detecting a motion vector, and an embodiment suitable for inter-frame encoding having a frame compensation, namely, a band compression apparatus.

Figure 10A:
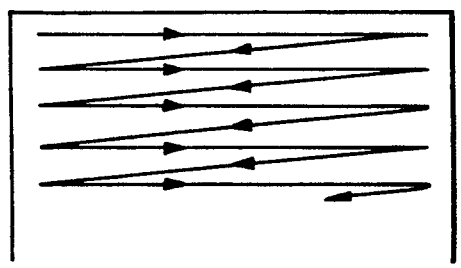
Figure 10B:
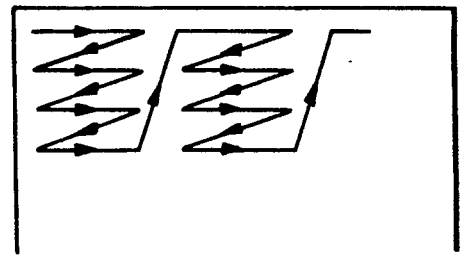
Figure 11A:
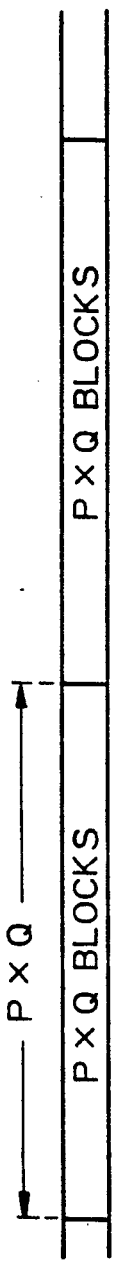
FIGS. 11A-C is a timing chart describing the conventional motion vector detection apparatus.
Figure 11B:
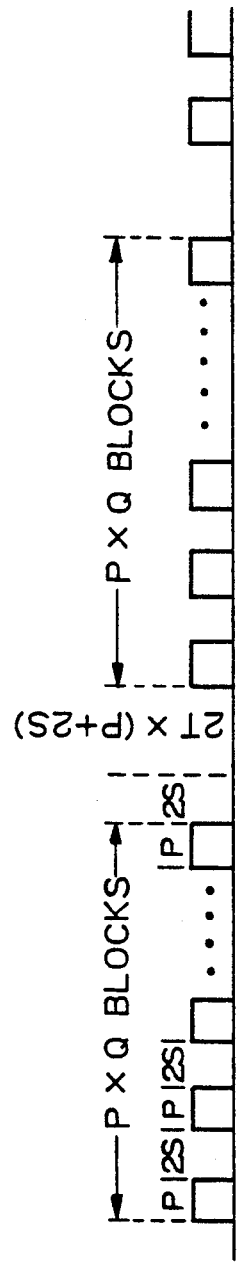
Figure 11C:
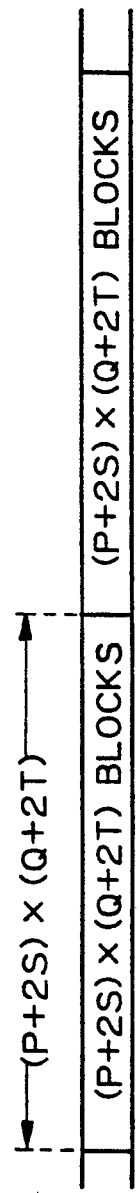
Figure 12:
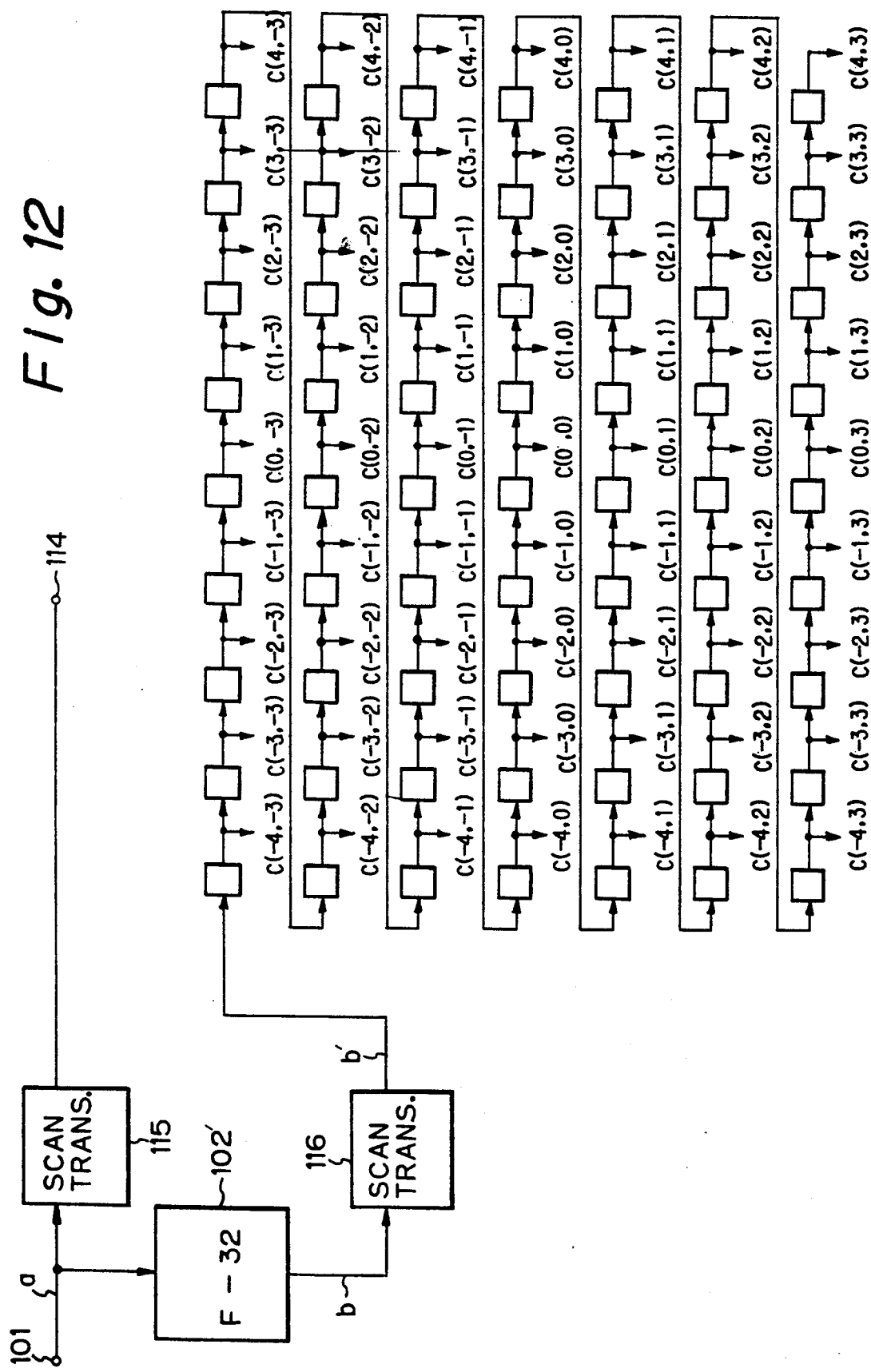
FIG. 12 is a partial block diagram showing the conventional motion vector detection apparatus.
Figure 13:
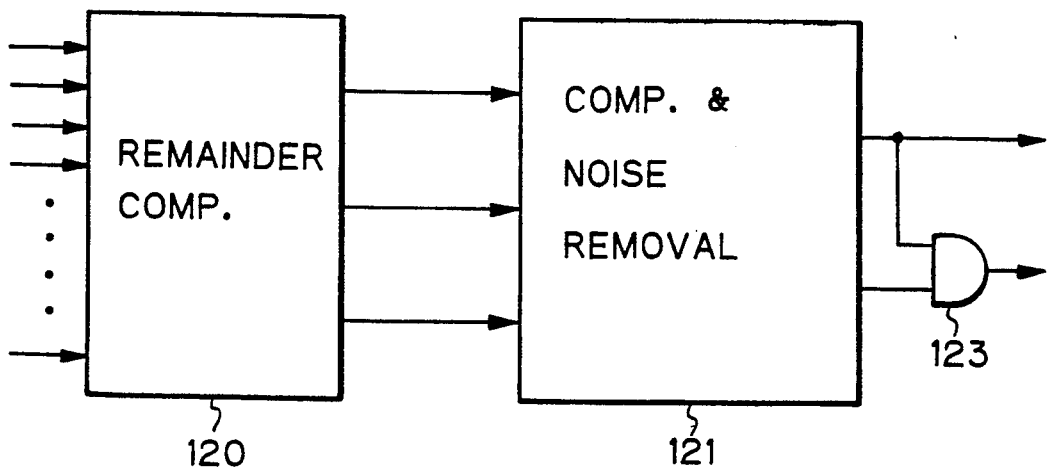
FIG. 13 is a block diagram of a determination portion of the conventional motion vector detection apparatus.

First, an embodiment with respect to matching blocks will be described. In this embodiment, it is supposed that a scanning sequence transformation of P×Q has been performed on the input data. In other words, the input data has the data sequence shown in FIG. 10B. As was described earlier, it should be noted that the scanning transformation of P×Q does not become a burden to the apparatus.

Figure 19:
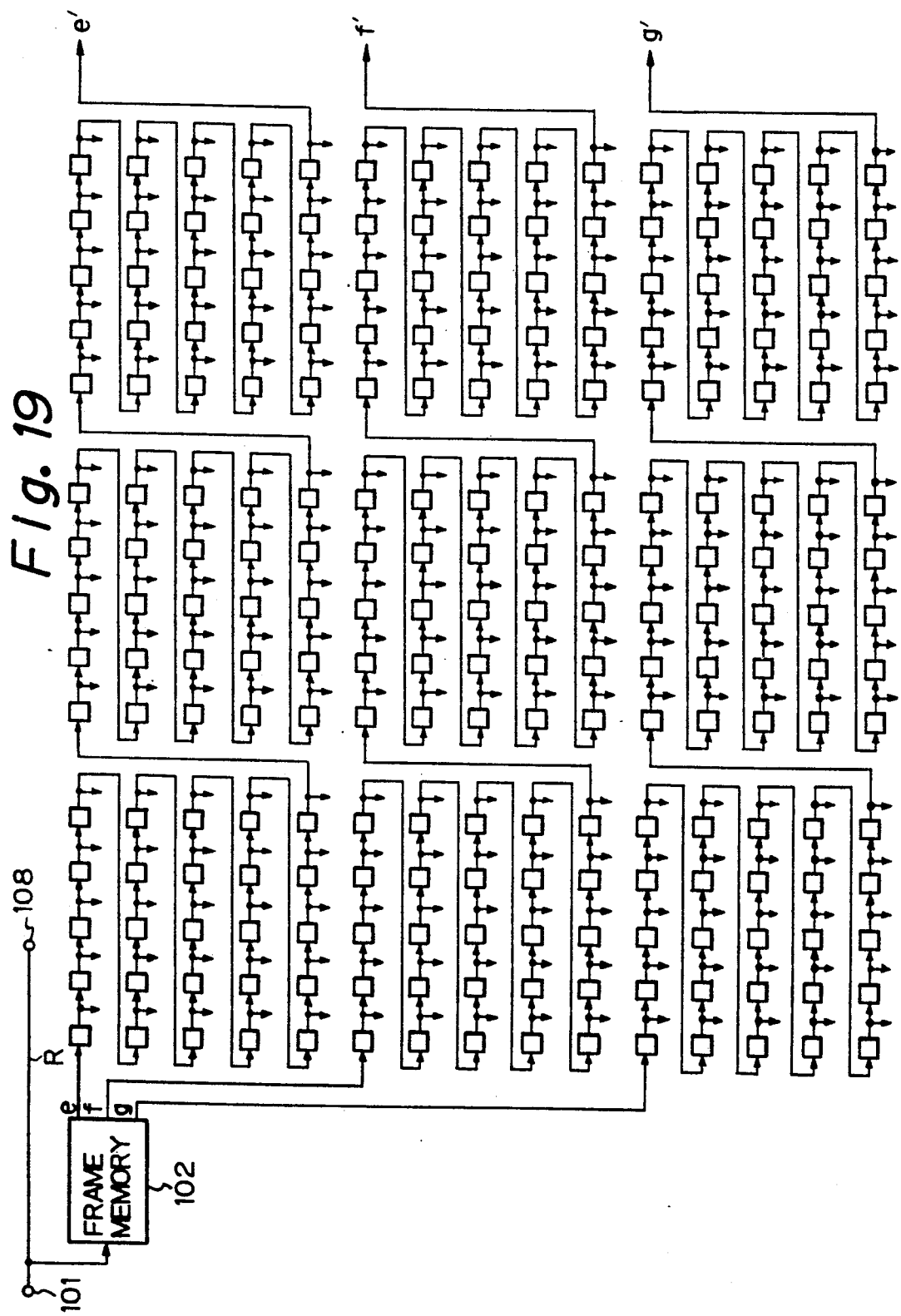
FIG. 19 is a block diagram showing an embodiment according to the present invention.

When the circuit shown in FIG. 19 is used, taps provide picture elements in such a manner that the output picture elements of R are vertically and horizontally inverted from the just preceding frame.

The frame memory 102 is provided with three outputs. An output e has a delay which is smaller than one frame by 5 H and 50 picture elements (F−5H−50). An output f has a delay which is smaller than one frame by 50 picture elements (F−50). An output g has a delay which is larger than one frame by 5 H minus 50 picture elements (F+5H 50).

Shift registers are connected to the outputs e, f, and g in such a manner that blocks are scanned. Each of the shift registers has a tap. 50 picture elements are twice as many as P×Q. A tap denoted by d in the figure, which is delayed by shift registers for 50 picture elements from f, has one frame difference from R.

Although the above mentioned circuit can be connected to each of e', f', and g', it is not necessary as will be described later. In addition, although f and g can be obtained by adding delay circuits to e' and f', respectively, in this embodiment, they are obtained from the frame memory.

First, when first data of a particular block of the current frame is present at R, the successive 25 picture elements which are output are for this block. At that time, first data as a block of the preceding frame at the same position of the block of the current frame on the screen is present at d. The successive 25 picture elements are data which accord with R in screen positions.

Figure 1:
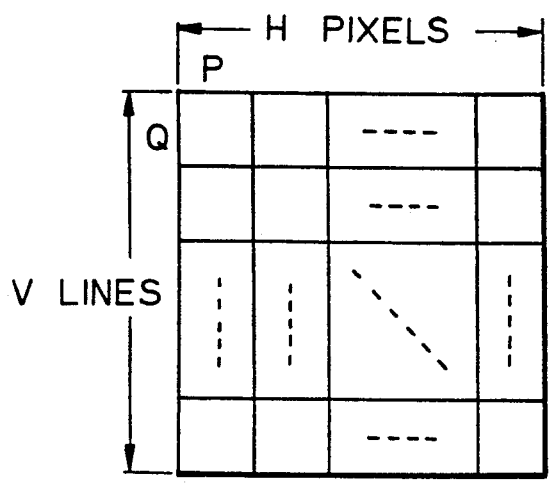
FIGS. 1, 2, 3A-C, 4, and 5 are schematic diagrams describing a conventional method of detecting motion vectors.
Figure 2:
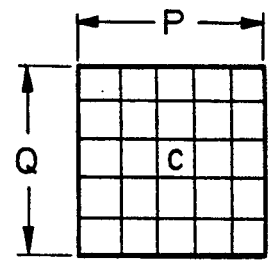
Figure 3A:
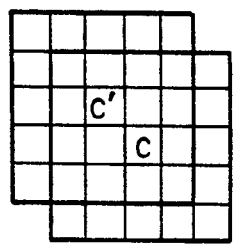
Figure 3B:
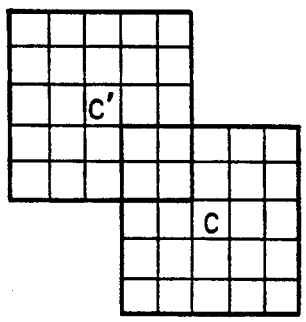
Figure 3C:
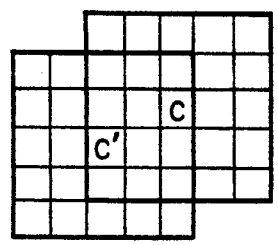
Figure 4:
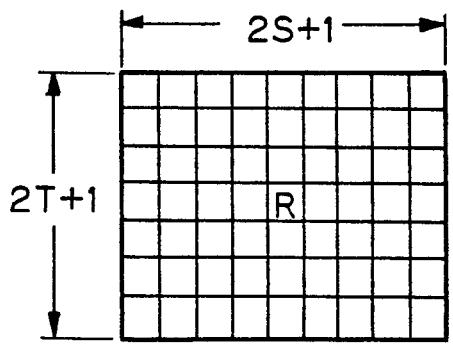
Figure 5:
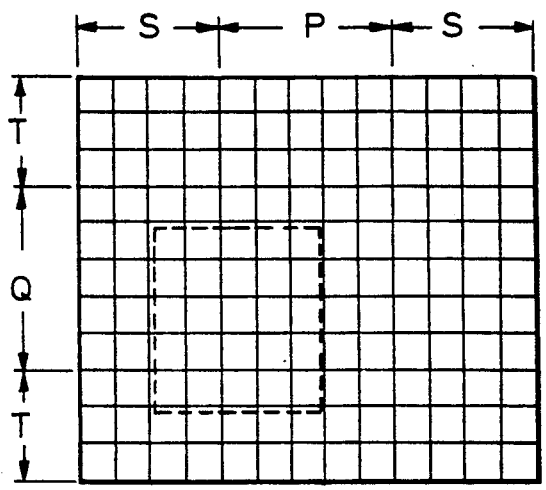
Figure 6:
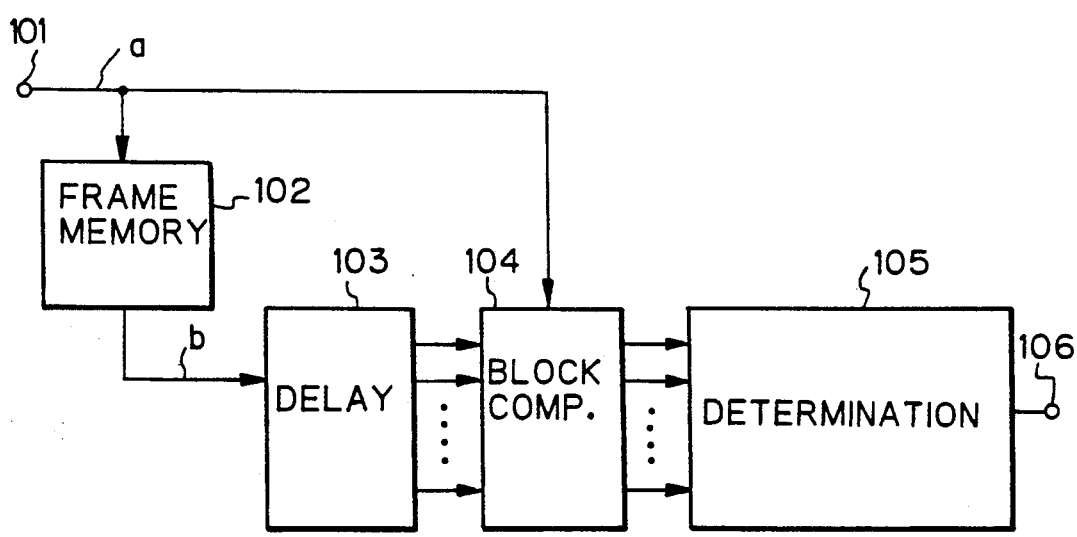
FIG. 6 is a block diagram outlining a motion vector detection apparatus.
Figure 7:
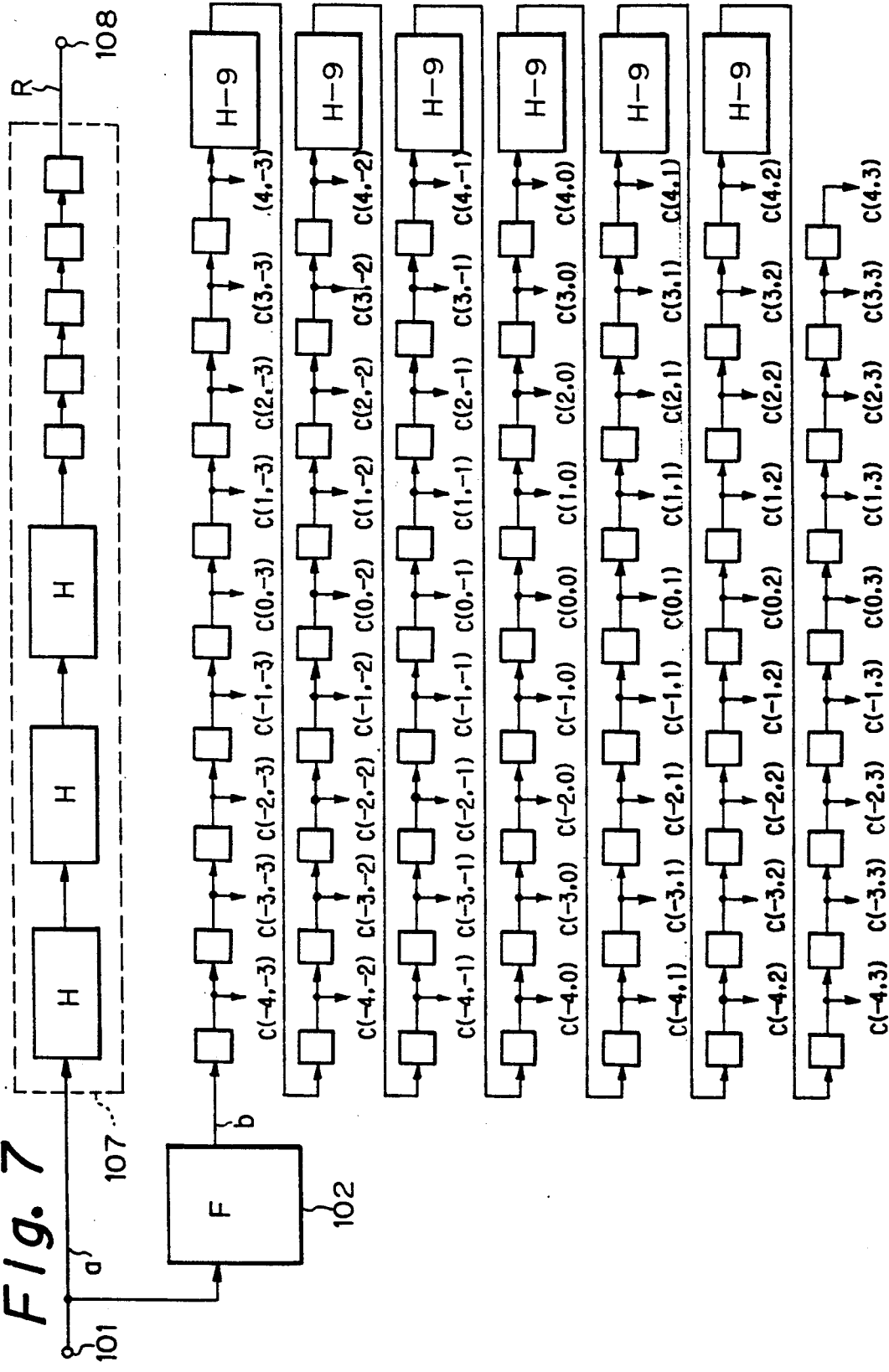
FIG. 7 is a partial block diagram showing a conventional motion vector detection apparatus.
Figure 8:
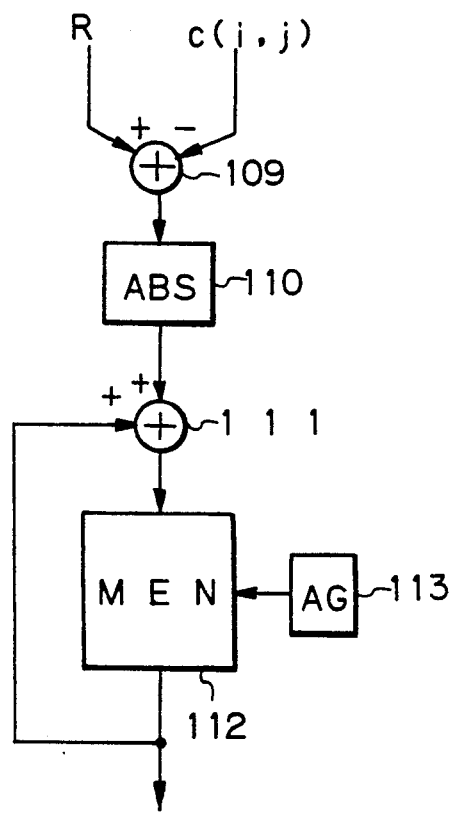
FIG. 8 is a block diagram showing another portion of the conventional motion vector detection apparatus.
Figure 9:
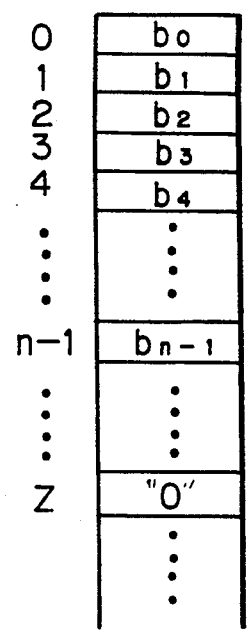
FIGS. 9 and 10A-B are schematic diagrams describing the conventional motion vector detection apparatus.

Thus, in the duration of the 25 picture elements, when blocks are compared by the circuit where the memory 112 shown in FIG. 8 is used simply as a register, the same matching ratio as the tap C (0, 0), can be obtained.

Figure 20:
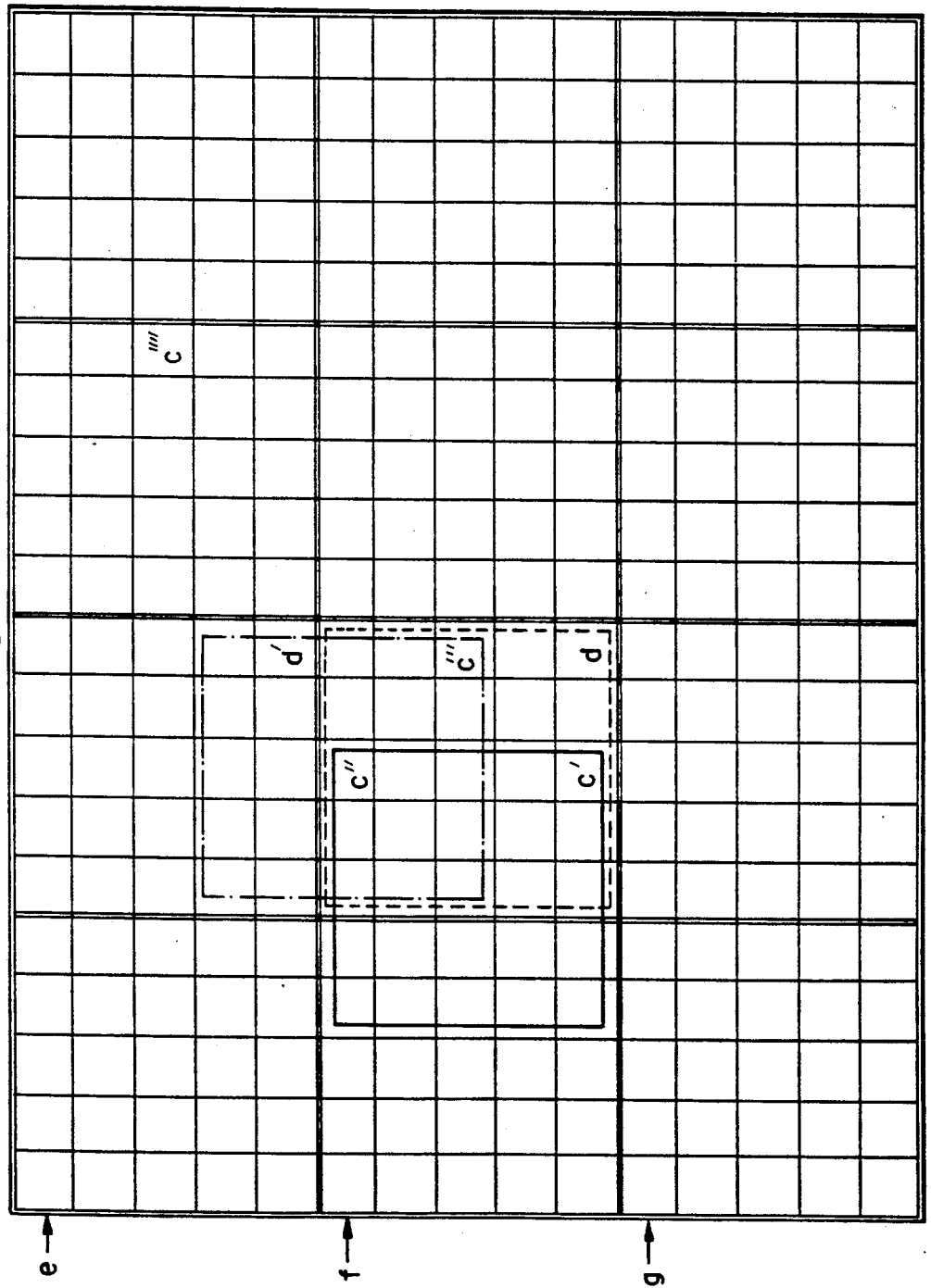
FIGS. 20 and 21 are schematic diagrams describing the embodiment.

FIG. 20 shows a feature array corresponding to each tap shown in FIG. 19. In the figure, each dual line box represents a shift register for one block ($P \times Q = 25$ picture elements). From now on, it is necessary to consider that the circuits are connected as shown in FIG. 19. The rows and lines of picture elements of the schematic diagram shown in FIG. 20 are vertically and horizontally inverted from those of the screen.

Now, consider the case where $-2$ picture elements are deviated in the horizontal direction, namely block comparison of C ($-2$, 0) and R. In this case, consider when first data of a particular block of the current frame is present at, R. The 25 picture elements of the preceding frame corresponding to this block are in the registers in the range of the box surrounded by the broken line. The block which is deviated for $-2$ picture elements in the horizontal direction is in the registers in the confines, or range of the box surrounded with a solid line. This range is divided by the dual line. Since the shift registers are not horizontally connected by the dual line, it is necessary to separately consider the right side and the left side of the dual line.

First, on the right side, as the tap C ($-2$, 0), C' which is deviated for $-2$ picture elements from d shown in FIG. 19 can be used. However, at the tap C', the 3 picture elements following the first picture, element of the block are valid. Thereafter, the next successive 2 picture elements are out of the range or confines of the box. Thereafter, the successive 3 picture elements are valid. Thereafter, the successive 2 picture elements are out of the range.

Then, with respect to the left side portion, when the picture element at the rightmost and lowermost position thereof is considered, at the third cycle, the first data of the block which was at C' should be present at the tap C'. However, the first data is actually present at the tap C''. Thus, on the left side, it is clear that C'' can be used as the tap. When the tap C' is out of the range of the box surrounded by the solid line, C' and C'' may be selected so that C'' is selected.

In conclusion, when blocks are matched in the state where they are deviated for $-i$ picture element (where $0 < i \leq = S$) in the horizontal direction, by using the tap of the shift register that precedes d by i taps and using another tap that precedes d by $P \times Q - i$ and by selecting these taps every (P−i)th cycle and i-th cycle, the required data can be supplied to the comparison circuit.

Likewise, consider the case where a block is deviated for $-2$ picture elements in the vertical direction. In this case, the range or confines of the box surrounded by the one dot line should be considered as the preceding block to which the present block is compared. This block is divided by different shift register groups. However, even in this case, in the same consideration, it is possible to select C''' and C''''.

In other words, in matching blocks which are deviated for $-j$ picture elements (where $0 < j < =$) T in the vertical direction, a tap which precedes d by $j \times Q$ taps and another tap which precedes d by $\{H \times Q - (Q-j) \times P\}$ (in other words, the former tap is a tap which is follows by $(Q-j) \times P$ taps than and has a delay from e, the delay being the same as that from f to d) are switched by the former $j \times P$ cycles and the later $(Q-j) \times P$ cycles.

In addition, consider the general case where a block is deviated for $-i$ picture element and $-j$ picture elements in the horizontal direction and the vertical direction, respectively. For example, consider the case where a block is deviated for $-3$ picture elements and $-2$ picture elements in the horizontal direction and the vertical direction, respectively. In this case, the range is represented by the solid line shown in FIG. 21. This range should be compared by another range represented with the broken line for R.

Figure 21:
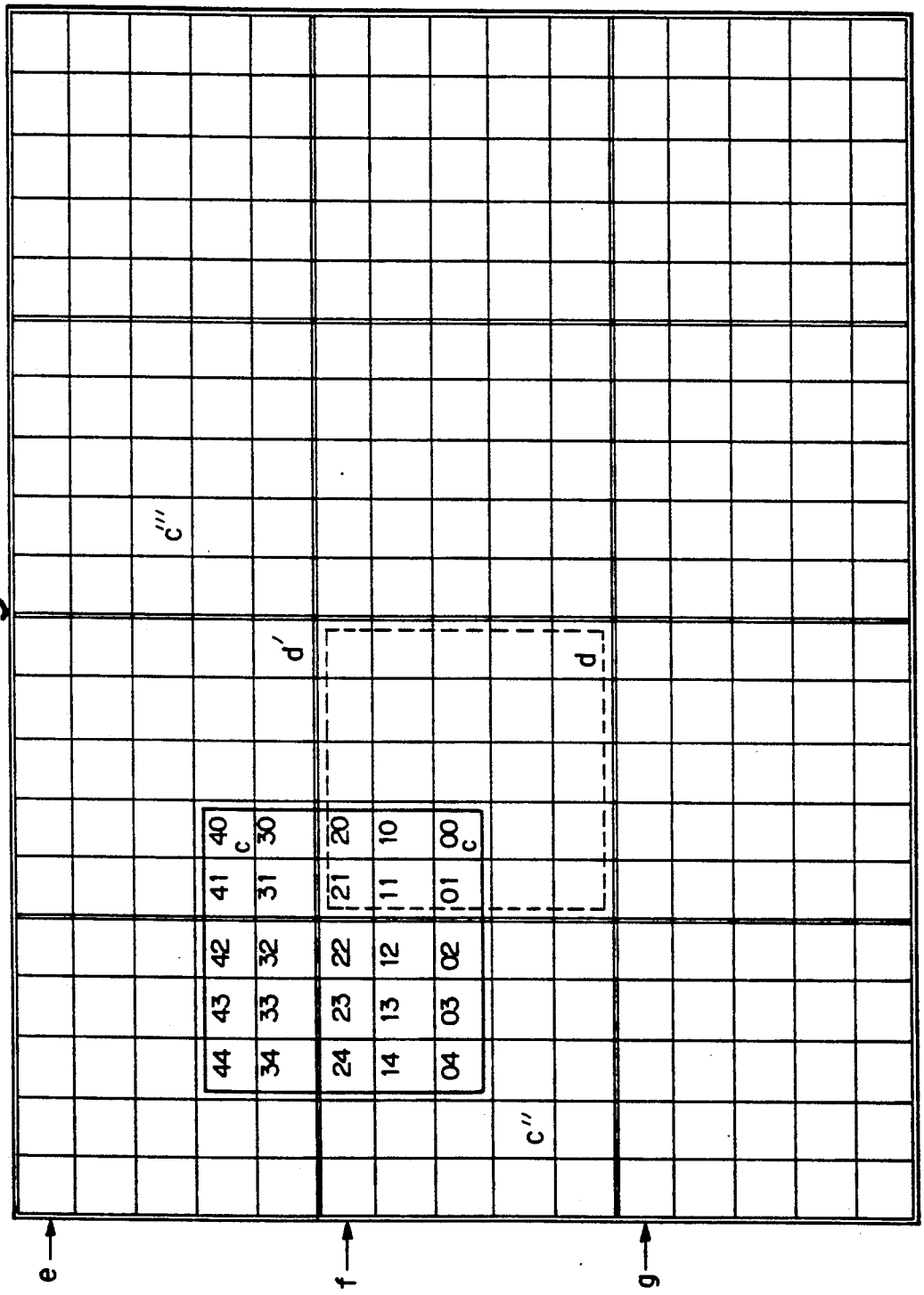
Figure 22:
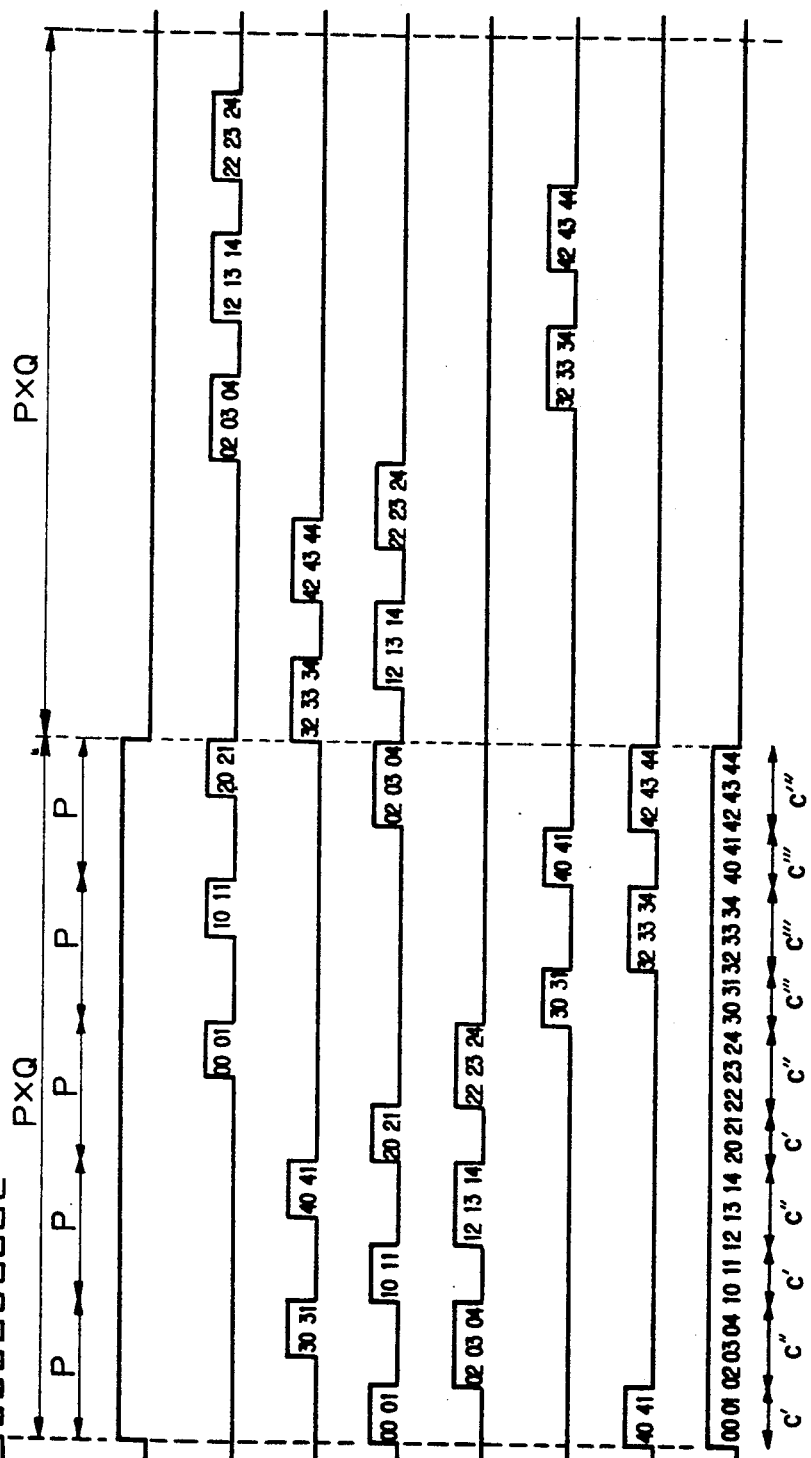
FIGS. 22A-I is a timing chart describing the embodiment.

The range represented by the solid line shown in FIG. 21 is divided by both the dual line in the vertical direction and that in the horizontal direction. Thus, the range is divided into four portions. When this range is considered with the connections of the shift registers shown in FIG. 19, the shift registers are separated at many positions. FIG. 22 shows how the shift registers are separated.

FIG. 22A shows a clock. In R shown in FIG. 22B, the timing where data of the current frame in the range represented by the broken line shown in FIG. 21 is represented as "H". This timing continues for $P \times Q = 25$ cycles. The data of the range represented by the solid line in FIG. 21 is represented as d and d' in FIGS. 22C and 22D, respectively.

Numbers 00 to 44 used in FIG. 22 represent where each picture element of the block to be compared in FIG. 21 is in the first cycle of FIG. 22 when the first picture element of the block is present in R. When 25 picture elements denoted by 00 to 44 are disposed as shown by y of FIG. 22I, they cannot be compared with R by the calculation unit shown in FIG. 8.

The range represented by the solid line shown in FIG. 21 is divided by two dual lines into the lower right portion, lower left portion, upper right portion, and upper left portion. The lower right portion consists of picture elements 00, 01, 10, 11, 20, and 21. These picture elements are matched with the data sequence of R at the tap C'.

The lower left portion consists of picture elements 02, 03, 04, 12, 13, 14, 22, 23, and 24. These picture elements are matched with R at the tap C'' with the same consideration as the case where the block is deviated only in the horizontal direction.

The upper right portion consists of picture elements 30, 31, 40, and 41. These picture elements are matched with R at the tap C''' with the same consideration as the case where the block is deviated only in the vertical direction.

The upper left portion consists of picture elements 32, 33, 34, 42, 43, and 44. For example, the picture element 32 is deviated from the position 00 on the screen by $-2$ picture elements and $-3$ picture elements in the horizontal direction and the vertical direction, respectively. When the block is not moved from one shift register group like the range represented by the broken line, the picture element 32 is at a position which is earlier than the position 00 by 17 stages. Thus, the tap C'''' which is later than the picture element 32 by 17 stages can be used.

The above description can be simplified with reference to the time charts shown in FIG. 22. The relations between C', C'', C''', and C'''' and d and d' are time delays. Thus, according to intervals of stages of shift registers, C', C'', C''', and C'''' shown in FIGS. 22E, 22F, 22G, and 22H can be obtained. For the data sequence of y, C' to C'''' are selected in the timing shown in FIG. 22I.

Generally, when a block is compared with another block which is deviated for $-i$ picture elements (where $0<i<=S$) in the horizontal direction and for $-j$ picture elements (where $0<j<=T$) in the vertical direction, by using (1) a tap which is earlier than d by $(j\times P+i)$ stages and represented by C', (2) a tap which is earlier than d by $\{(P\times Q+j\times P)-(P-i)\}$ stages and which is represented by C'', (3) a tap which is later than d' by $(j\times P-(P-i)\}$ stages and which is represented by C''', and (4) a tap which is earlier than d' by $P\times Q-\{(Q-j)\times P+(P-j)\}$ stages and which is represented by C'''' and properly selecting an output, the output is compared with the R output. The selection procedure is as follows:

(1) in the range from the start of the block to $(Q-j)\times P$ cycles thereof, C' and C'' are selected at the $(P-i)$ cycles and i cycles, respectively, and (2) in the remaining $j\times P$ cycles, C''' and C'''' are selected at the $(P-i)$ cycles and i cycles, respectively.

The above mentioned operations are summarized as follows.

Figure 23:
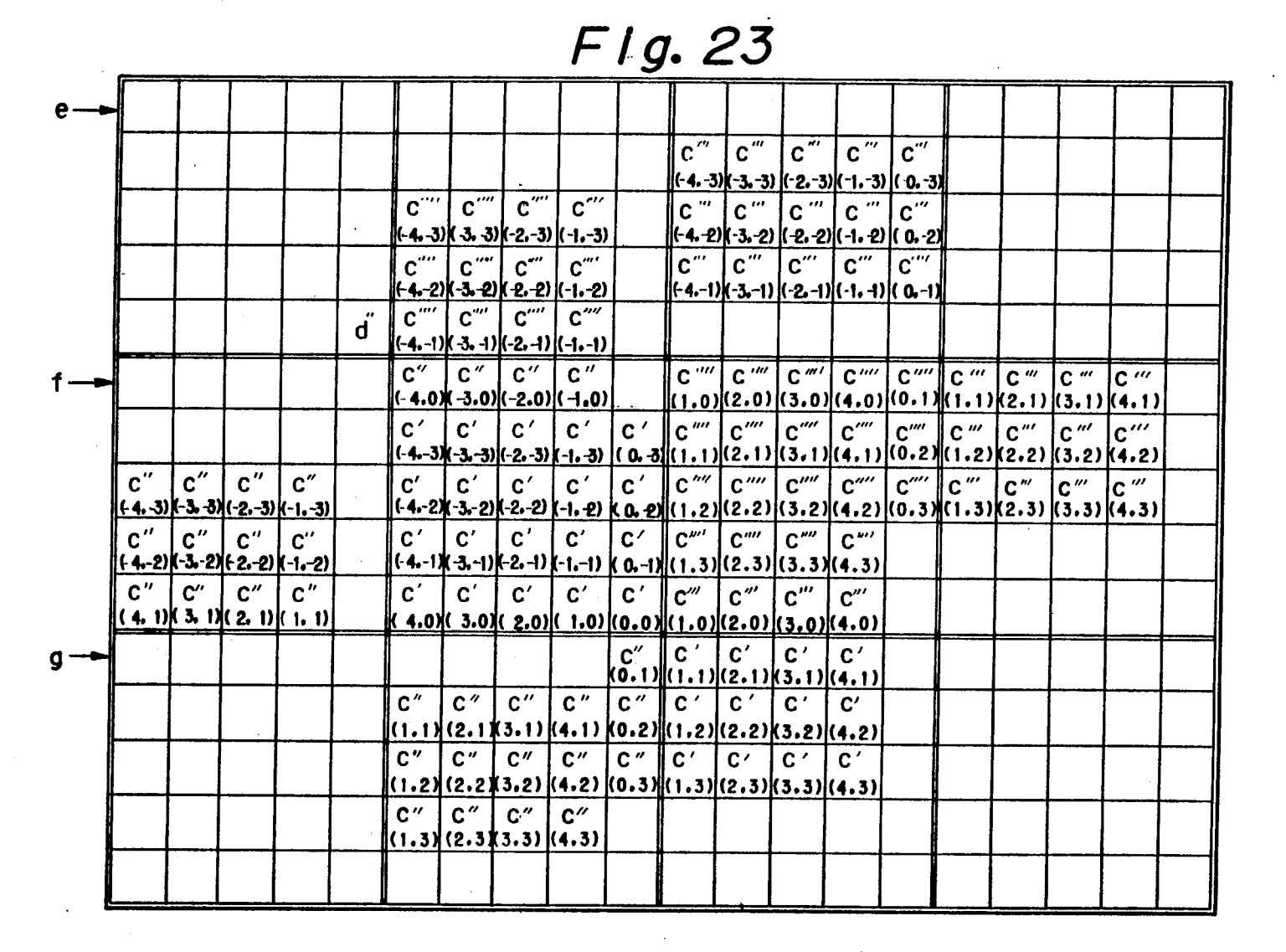

When a block is compared by another block which is deviated for $-i$ picture elements and $-j$ picture elements in the horizontal direction and the vertical direction, respectively (where $0<=i<=S$ and $0<=-j<=T$), the required data sequence can be obtained by switching at most four taps of C' $(-i, -j)$, C'' $(-i, -j)$, C''' $(-i, -j)$, and C'''' $(-i, -j)$ shown in FIG. 23.

In FIG. 23, the position of d is at C' (0, 0). In addition, in the embodiment described so far, cases where blocks are deviated negatively both in the horizontal and vertical directions were described. However, cases in which blocks are positively deviated both in the horizontal and vertical directions can be considered in the same manner. FIG. 23 shows those taps necessary in the case where blocks are deviated positively both in the horizontal and vertical directions. Since the taps which are used for the case where a block is deviated positively in the horizontal direction and negatively in the vertical direction overlap with those required for other purposes, they are omitted.

In FIG. 23, at the input e, shift registers for 3 blocks are required; at the input f, shift registers for 4 blocks are required; at the input g, shift registers for 3 blocks are required. However it is possible to technically decrease the number of shift registers.

For example, in FIG. 23, the position of C' (0, 0) is used as a reference in those cases where a block is deviated positively and negatively. When the reference is moved to the position d'' shown in FIG. 23, most of the taps necessary for the case where the block is positively deviated can be used in common with those necessary for the case where it is negatively deviated.

Figures 24, 25:
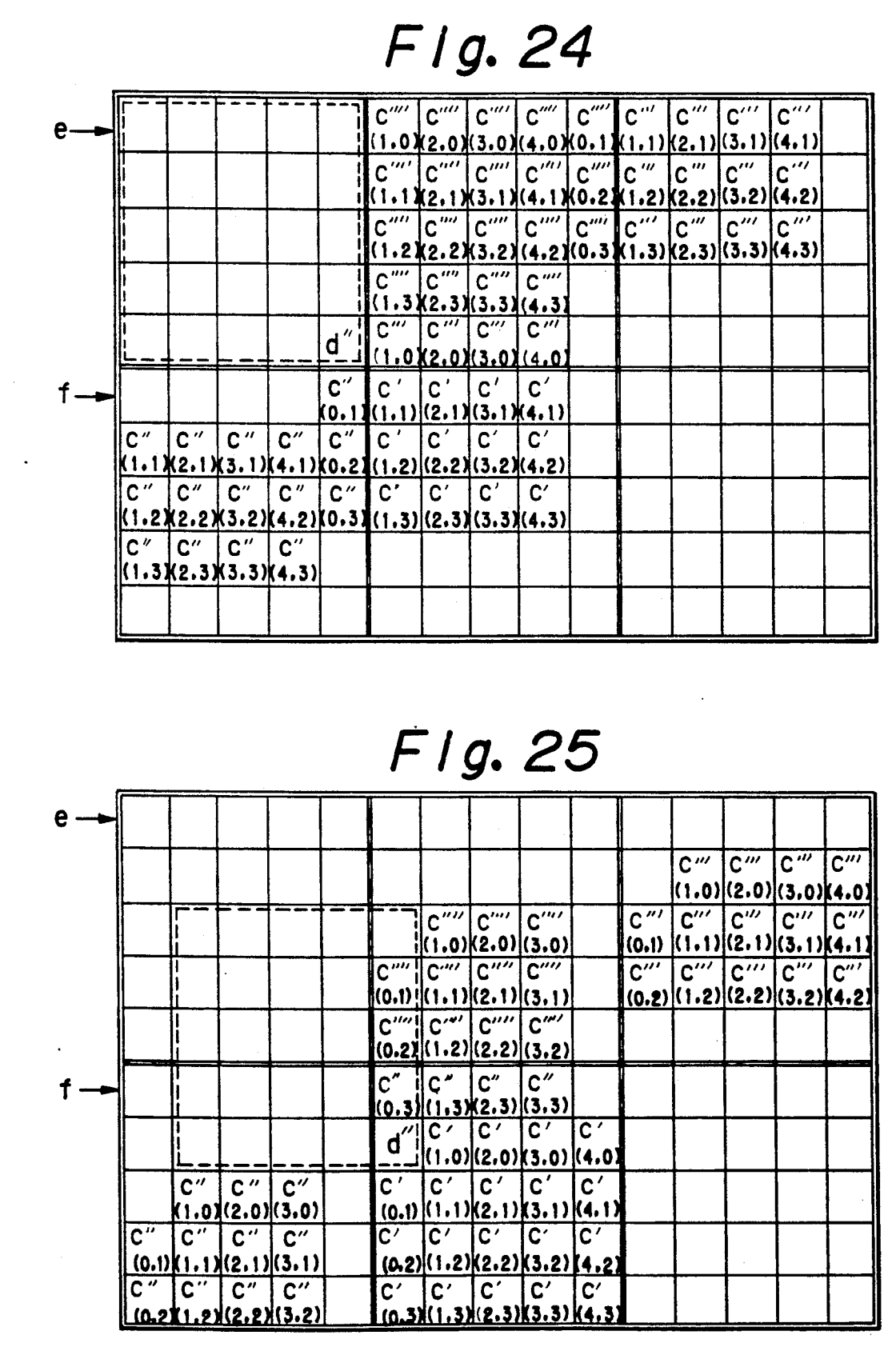

When a block is positively deviated and taps are obtained as shown in FIG. 24, shift registers at least necessary for g become unnecessary in consideration of FIG. 23. However, although this may be apparently correct, when the reference is changed from the position d to the position d'', the taps should be changed depending on whether the block of R is deviated positively or negatively. When the block is positively deviated, taps with a delay amount which is earlier than R by the delay difference between d and d' should be provided. Thus, in comparison with the shift registers which can be omitted for g, a marked advantage cannot be obtained.

For example, in FIG. 24, even in the case where a block is deviated positively both in the horizontal and vertical directions, the same position as a case where a block is deviated negatively both in the horizontal and vertical directions, namely the position C' (0, 0) is used as a reference. However, when this reference is moved to the position d'' shown in FIG. 25, all the taps necessary for the case where the block is deviated positively both in the horizontal and vertical directions can be common to those necessary for the case where the block is deviated negatively both in the horizontal and vertical directions.

The position d'' shown in FIG. 25 is a position where the block is deviated from the position d for $i=S=4$ and $j=T=3$ which are picture elements maximally deviated. When the position d'' is used as the reference position, the taps in the case where the block is deviated negatively both in the horizontal and vertical directions can be used.

Likewise, in a case where a block is deviated positively in the horizontal direction and negatively in the vertical direction or vice versa, when taps are obtained as shown in FIG. 25, the shift registers with respect to g are not required in consideration of FIG. 23. In addition, the shift registers required with respect to f are only for two blocks. However, in a case where a block is deviated positively both in the horizontal direction and the vertical direction, since the reference position is changed from d to d'', it is necessary to provide taps with a delay amount of a tap earlier than R for a delay difference between d and d' while the block of R is deviated negatively both in the horizontal and vertical directions. However, the size of the delay circuit necessary for the above mentioned operation is small.

Since the shift registers with respect to e are not connected for the first one block, they can be omitted.

Figure 26:
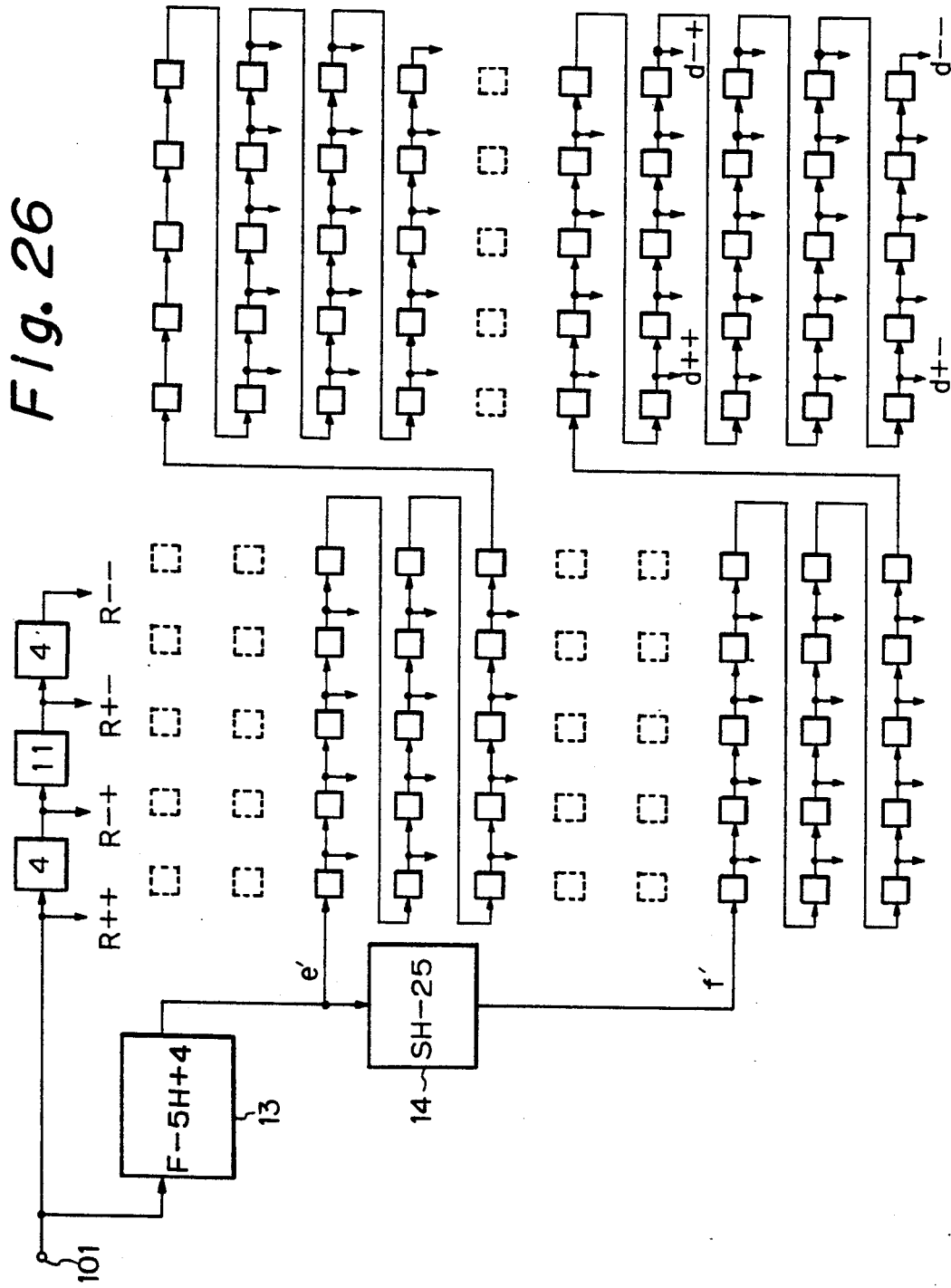
FIGS. 26 and 27 are block diagrams describing the embodiment.
Figure 27:
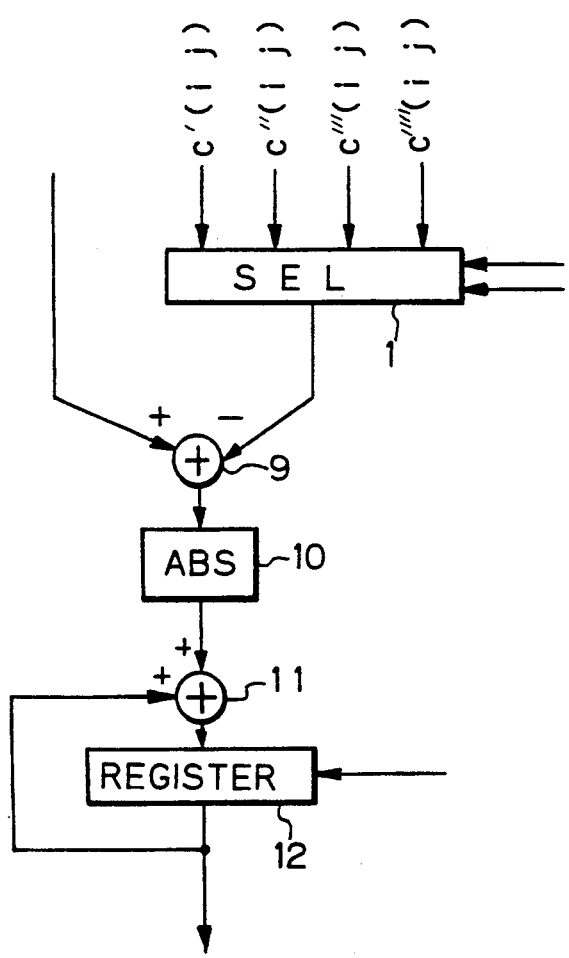

As was described above, the present embodiment can be constructed of frame memories 13 and 14 and a delay portion shown in FIG. 26 and a block comparison portion shown in FIG. 27.

In conclusion, as shown in FIG. 26, depending on whether a block which is deviated in the vertical and horizontal directions is positive or negative, R can be categorized as four types: R++, R−+, R+−, and R−−.

Since the reference positions of such types are d++, d−+, d+−, and d−− shown in FIG. 26, the delay differences thereamong are compensated. In other words, the delay difference between R++ and R−+ just becomes S (=4 picture elements), while that between R++ and R−− becomes TP+S (=3×5+4=19 picture elements). The shift registers connected to the outputs e, f, and g shown in FIG. 19 are those connected to e' and f'.

As shown in FIG. 25, the output e' is not connected to taps for the first block. Thus, they are omitted. Instead, the frame memory is correspondingly delayed. In addition, with respect to the next block, 10 picture elements of the first two lines are not used. Thus, the frame memory is also delayed. Moreover, shift registers with respect to the output g are not necessary. FIG. 26, does not show them. The small boxes represented by broken lines in FIG. 26 are unnecessary shift registers and thus are omitted.

The delay difference between the output e, and the output f' is normally Q lines, which are Q×H picture elements. However, since the first block of the shift registers connected to the output e' is omitted, a delay of Q×H−P×Q=5H−25 picture elements takes place. The frame memory should be constructed so that the difference between R− − and d− − becomes one frame (F) and thereby F−2(PQ)+(TP+S)−(QH−PQ)+10=F−5H+4.

Blocks are compared by using a circuit such as shown in FIG. 27. In other words, a cumulative unit comprising a subtraction circuit 9 for subtracting data selected by a selector 1 from R, an absolute value calculation circuit 10, an addition circuit 11, and a register 12 is used.

With respect to R, in a case where a block is deviated for i picture elements in the horizontal direction and for j picture elements in the vertical direction, when i is positive and j is positive, R++ is used; when i is negative and j is positive, R−+ is used; when i is positive and j is negative, R+− is used; and when i is negative and j is negative, R−− is used.

Up to four taps of C' (i, j), C" (i, j), C''' (i, j), and C'''' (i, j) are connected to the selector 1. One of them is selected in accordance the method described in conjunction with 22. The difference between frames is obtained. Thereafter, its absolute value is calculated (its square value or the like may be calculated). Thereafter, data this absolute value of difference for one block is accumulated.

In the above mentioned embodiment, the case where S<=P and T<=Q was described. When other cases are considered, the construction will become more complicated. However, only by extending the same manner, such cases can be accomplished.

The block comparison calculation circuit shown in FIG. 27 is required for each deviation amount (i, j). However, as was described earlier, part of them may be omitted. In addition, when the calculation speed can be increased by for example n times with respect to the data rate and the calculation unit, n sets of (i, j) can be time multiplexed with one calculation circuit. In this construction, the number of calculation units can be decreased to 1/n.

· In the above mentioned embodiment, a picture which is not interlaced was described. However, the present invention can be applied to the case where a picture is interlaced. However, when a motion vector between fields being interlaced is obtained, j of the above mentioned deviation (i, j) has an offset of 0.5 picture elements.

Then, in accordance with the result from block matching obtained by the above mentioned embodiment, another embodiment which simplifies the determination procedure for detecting a motion vector will be described.

Figure 28:
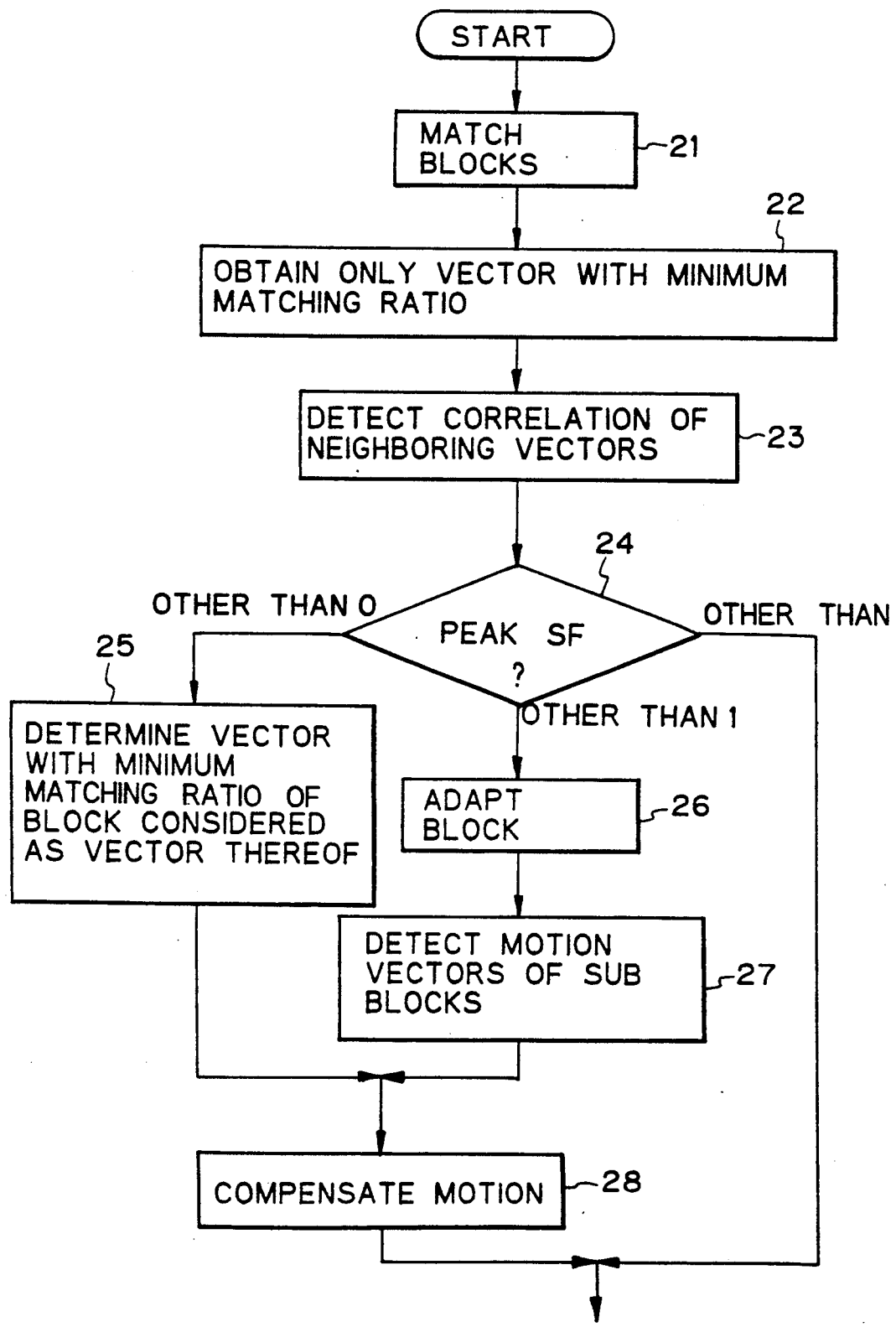
FIG. 28 is a flow chart describing a second embodiment according to the present invention.

FIG. 28 shows a procedure implemented by this other embodiment. As opposed to the prior art shown in FIG. 16, the distribution of the matching ratio, namely various minimum values are not detected.

After blocks are matched in the step 21, the vector amount (x, y) with the minimum matching ratio is obtained (in the step 22).

Figure 14:
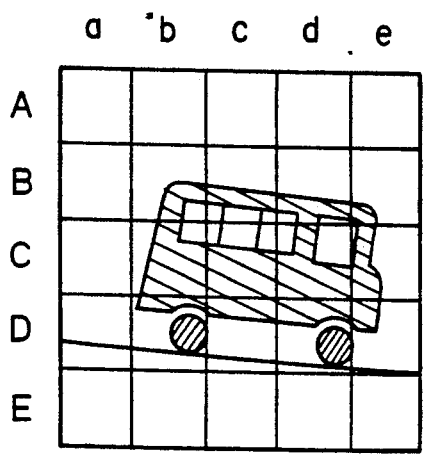
FIGS. 14, 15A-B, and 17 are schematic diagrams describing the determination portion of the conventional motion vector detection apparatus.
Figure 15A:
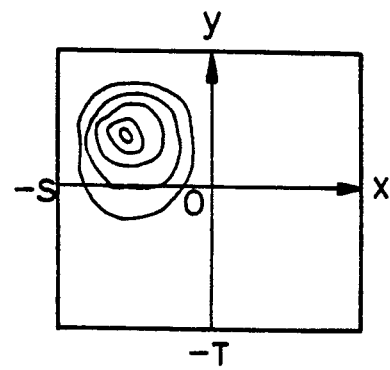
Figure 17:
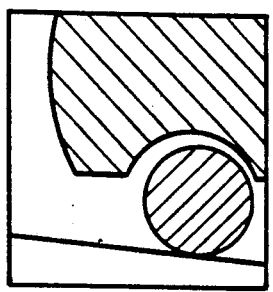
Figure 15B:
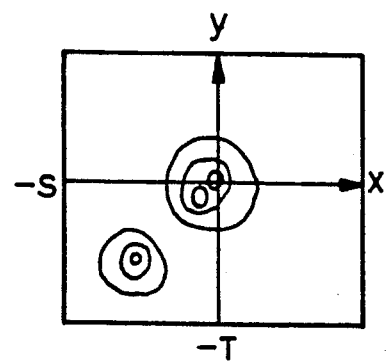
Figure 18:
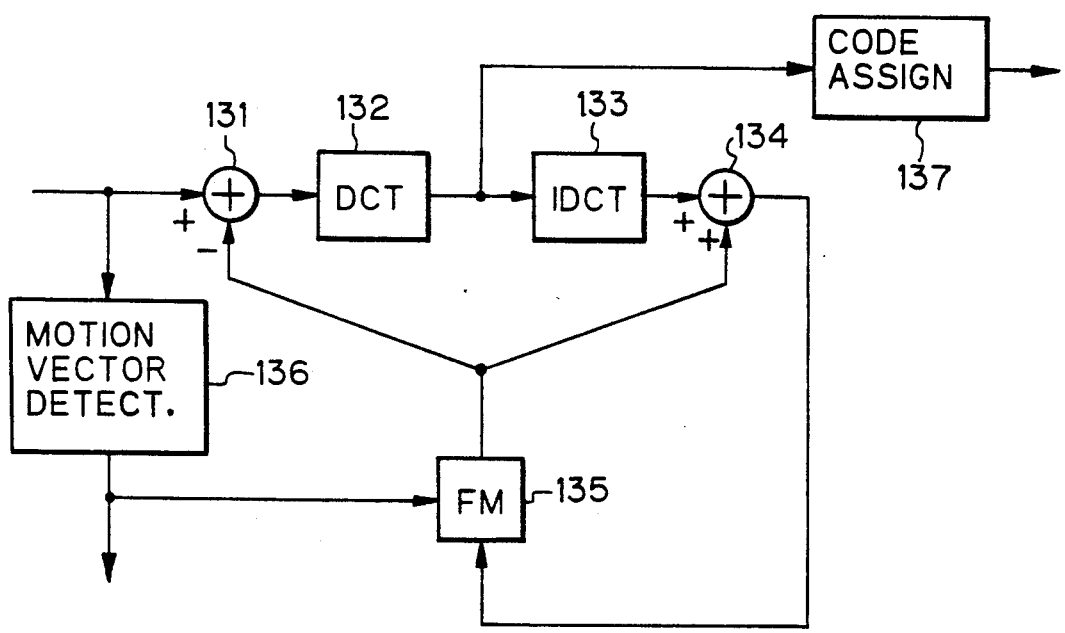
FIG. 18 is a block diagram describing a conventional band compression apparatus.
Figure 29:
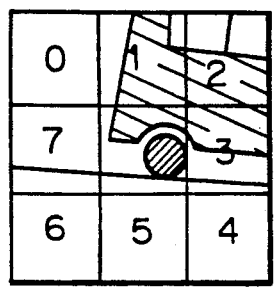
FIGS. 29, 30A-B, 31A-B, and 32A-C are schematic diagrams describing the second embodiment according to the present invention.
Figure 30A:
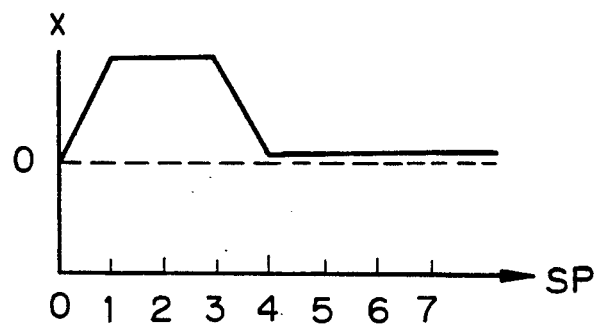
Figure 30B:
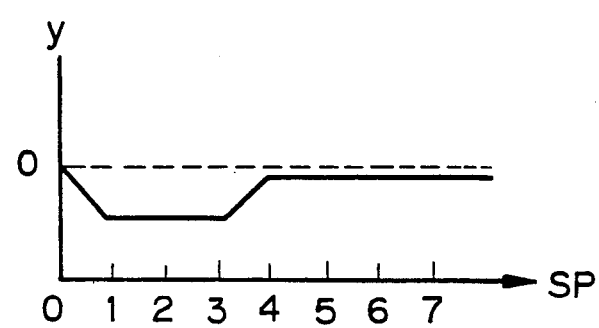

Thereafter, the correlation of the neighboring vectors is obtained (in the step 23 In other words, with respect to the vector with the minimum matching degree (xi, yi) (where i=block number) the vectors of the eight blocks which neighbor the block being considered are Fourier transformed for example. x and y represent the horizontal direction and the vertical direction, respectively. Now, assume that the block D−b shown in FIG. 14 is considered. The eight neighboring blocks of the block D−b are numbered therearound as shown in FIG. 29 (in any direction and from any block). The block number assigned to each neighboring block is denoted by i. In the case shown in FIG. 29, for example, a wave form as shown in FIG. 30 is obtained. In FIG. 30, the horizontal axis represents a space position (SP), which corresponds to the number i. On the other hand, the vertical axis represents the x component or y component of a motion vector. FIG. 30A represents the x component of the motion vector, while FIG. 30B represents the y component of the motion vector. When an automobile moves to the right in FIG. 14 (assuming that when it moves to the right, x is positive and that when it moves upwardly, y is positive), the wave forms as shown in FIG. 30 are obtained.

Figure 31A:
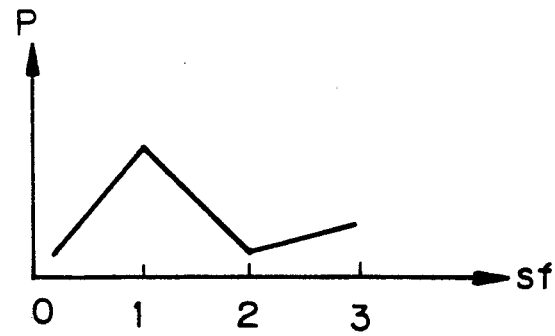

In the case shown in FIG. 29, i=1 and i=3 are the blocks C−b and D−c, respectively. Since these blocks contain a contour, it cannot be determined if the motion vectors ar those of the background or the automobile. However, when the wave forms shown in FIG. 30 are obtained, they are frequency analyzed by Fourier transformation. Thereafter, a result as shown in FIG. 31A will be obtained. FIG. 31A represents power spectrum where the the wave forms have been Fourier transformed. In FIG. 31A, since one fundamental wave is present, one peak takes place at the position 1 of the space frequency (sf) on the horizontal axis.

Figure 31B:
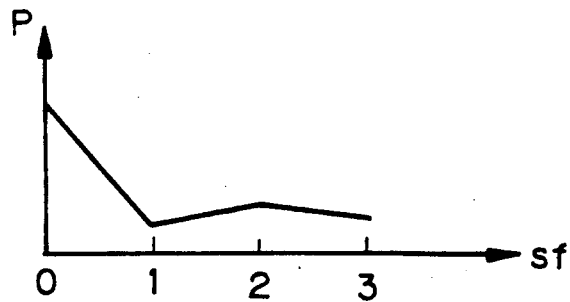

FIG. 31B shows for example the case of only background or the inside of a large moving portion. Vectors with the minimum matching ratio of the neighboring blocks of a block being considered are nearly the same, namely sf=0. Thus, in this figure, a peak takes place in the DC component.

After Fourier transformation is performed, a frequency component with a particular level or more is found for the data shown in FIGS. 31A and 31B. Thereafter, that frequency component is categorized as the space frequency (in the step 24 of FIG. 28).

When there is a peak in the DC component as shown in FIG. 31B, since motion vectors of the neighboring blocks of the block being considered are nearly the same, it is supposed that the block being considered is the same as the neighboring blocks. Thus, it is supposed that the motion vector is a vector with the minimum matching ratio of the block being considered (in the step 25 When the block being considered is an isolated motion subject, the vector of the block being considered may differ from those of the neighboring blocks. However, since it is difficult to detect the isolated motion subject, whether the vector with the minimum matching ratio relates to the motion subject or it is same as the neighboring blocks should be determined depending on the magnitude of the matching ratio. Thus, it seems that any special problem does not takes place.

As shown in FIG. 31A, when there is a peak at sf=1, motion vectors of the neighboring blocks of the block being considered have one wave change in one cycle. It means that the block being considered is present at the contour of the motion subject. In this case, two motion vectors should be present in this block. Thus, only in this situation, is the block adaptively divided into four portions so as to make four sub blocks. Thereafter, the motion vectors of these sub blocks are detected (in the steps 26 and 27 of FIG. 28). However, in this case, it is not necessary to perform the block matching once again. In other words, it is obvious that the vector to be obtained is in the vicinity of a group of two types of vectors which are present in the neighboring blocks. Thus, since the block matching is performed in a very limited range, its operation is simplified.

After the steps 25 and 27 are performed, motion compensation is performed (in the step 28). However, when the output of the Fourier transformation does not match the wave forms as shown in FIG. 31, the motion vectors cannot be detected. Thereby, the motion compensation is canceled.

Figure 32A:
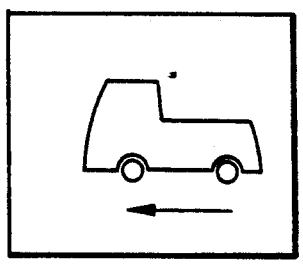
Figure 32B:
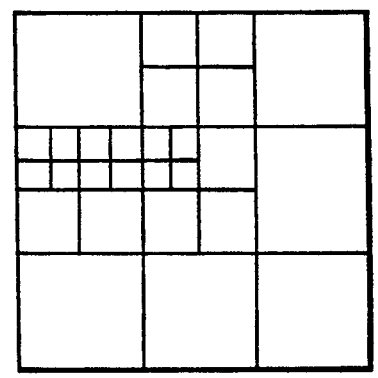
Figure 32C:
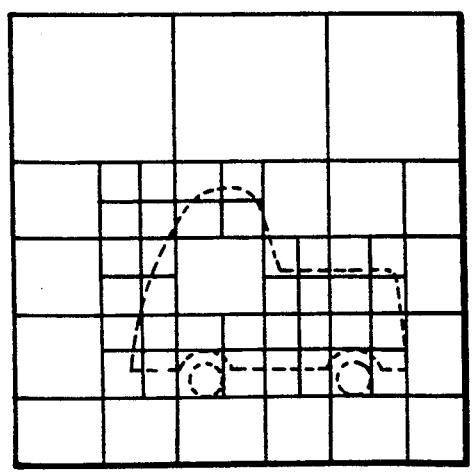

FIG. 32 is a schematic diagram describing an adaptive block segmentation. In the case where an automobile which is a motion subject moves as shown in FIG. 32A, when a peak is detected at sf=1 to 3 in the determination of the step 24, the neighboring blocks are segmented locally into sub blocks as shown in FIG. 32B. As shown in FIG. 32C, the motion vector is recursively detected for each sub block.

FIG. 33 shows an example of the above mentioned determination portion according to the present invention. A remainder comparison circuit 31 detects the position of deviation where the remainder per block is minimum. The result is output as a temporary motion vector. The temporary motion vector is supplied to a delay circuit group 32. The delay circuit group 32 comprises registers denoted by P for storing a temporary motion vector and shift registers denoted by Q for storing a temporary motion vector with picture elements less than the block by 3 picture elements in the horizontal direction. The determination portion further comprises an orthogonal transformation circuit 33 for performing Fourier transformation, for example, and a peak detection circuit 34 for supplying the output thereof. At an output terminal 38 of an OR gate 35, a determination signal for determining whether there are peaks at sf=1, 2, and 3 is obtained. The determination signal is supplied to a sub block segmentation circuit. At the output of an AND gate 36, a motion vector is output.

The Fourier transformation described above can be replaced by the Hadamard transformation, the Hartley transformation, or the like. In other words, various wave numbers and the reference wave are correlatively calculated so as to find which wave number has the strongest correlation with the reference wave.

As a supplementary description with respect to the case of using Fourier transformation, since this transformation requires many multiplications, it seems that the transformation apparently requires complicated operations. However, the Fourier transformation can always be calculated in eight degrees. It is widely known that by employing the FFT method, many multiplications are not used for the operations in eight degrees, but many additions. Thus, the Fourier transformation does not involve a problem. On the other hand, in the Hadamard transformation, since the coefficients are 1 or 0, the operations can be even more simplified.

The procedure shown in FIG. 28 is simpler than a conventional process and does not require complicated determinations.

Figure 34:
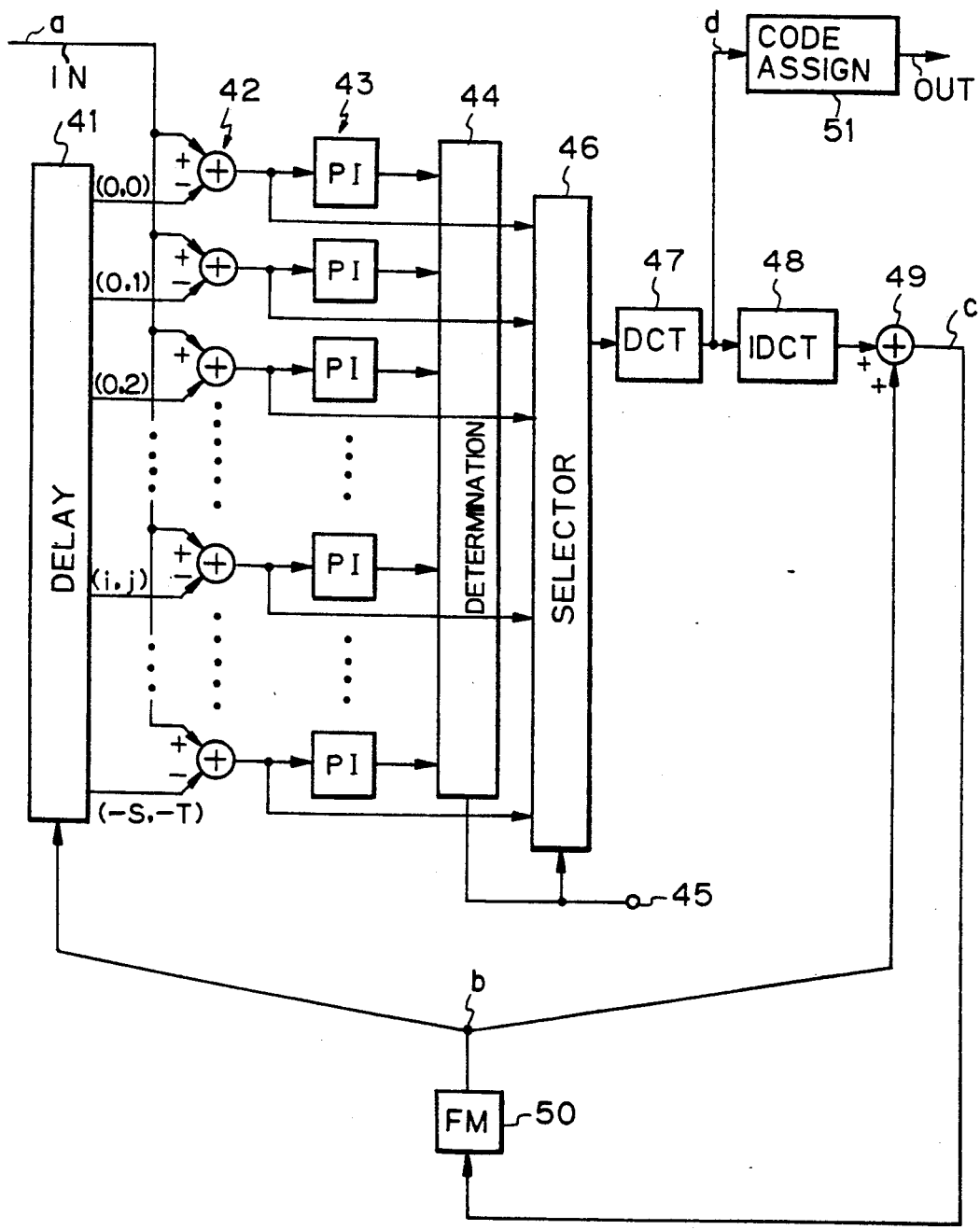
FIG. 34 is a block diagram of a third embodiment according to the present invention.

Last, another embodiment of the present invention which is a combination of motion vector compensation and frame differential encoding will be described. FIG. 34 shows this embodiment.

In FIG. 34, reference numeral 41 is a delay portion for performing the block matching described in the first embodiment. Reference numeral 42 is a subtraction circuit group. Reference numeral 43 denoted by PI is a power integration circuit group. The PI circuit comprises a multiplication circuit for squaring a value and a circuit for cumulating the output thereof. The output of the power integration circuit group 43 is supplied to a determination circuit 44. The subtraction circuit group 42 and the power integration circuit group 43 are provided for each of (i, j) (where i = −S to +S and j = −T to +T), a total of $(2S+1) \times (2T+1)$. The determination portion 44 selects a frame difference having a deviation amount with minimum power difference. At an output terminal 45, a motion vector being detected is obtained.

A selector 46 is connected to the subtraction circuit group 42. An output of the selector 46 is supplied to a transformation circuit 47. The output d of the transformation circuit 47 is obtained through a sign assignment circuit 51 as an encoded output. In addition, the output d of the transformation circuit 47 is also supplied to an addition circuit 49 through an inverse transformation circuit 48. An output signal c of the addition circuit 49 is supplied to a frame memory 50. An output b of the frame memory 50 is supplied to the delay portion 41 and the addition circuit 49

The difference between the construction of the present embodiment and that of the prior art is that the portion for detecting a motion vector is disposed in the encoding circuit loop.

When a method for detecting decreasing motion vectors is to be used or when motion vectors are obtained with a real number, not an integer number by using the $(2S+1) \times (2T+1)$ calculation circuits shown in FIG. 34, the selector 46 should be provided with a variable delay circuit. In this construction, the delay amount of the variable delay circuit can be controlled for the motion vectors being decreased. In addition, it is possible to connect a delay circuit having an interpolation calculation circuit, for example, a linear interpolation circuit, to the selector 46 so as to obtain a frame difference at a desired deviated position. Moreover, it is possible to use a combination of the above two constructions.

As was described above, the band compression apparatus according to the present invention requires only one frame memory, thereby the size of the apparatus becomes small. In addition, address control (delay amount control) of the frame memory is not required. Although the selector is new added in comparison with the prior art, it does not markedly increase the hardware.

Although only the DCT transformation circuit and the inverse transformation circuit are provided in the loop shown in FIG. 34, it is possible to include various processes therein. However, since such processes are independent from the present invention, they are not described. In addition, although the block comparison (matching ratio calculation) circuit uses a power (square) techniques, it may be accomplished by using an absolute value or another non-linear type calculation. Moreover, methods which have been known for detecting decreasing motion vectors can be also applied to the present invention.

Figure 35:
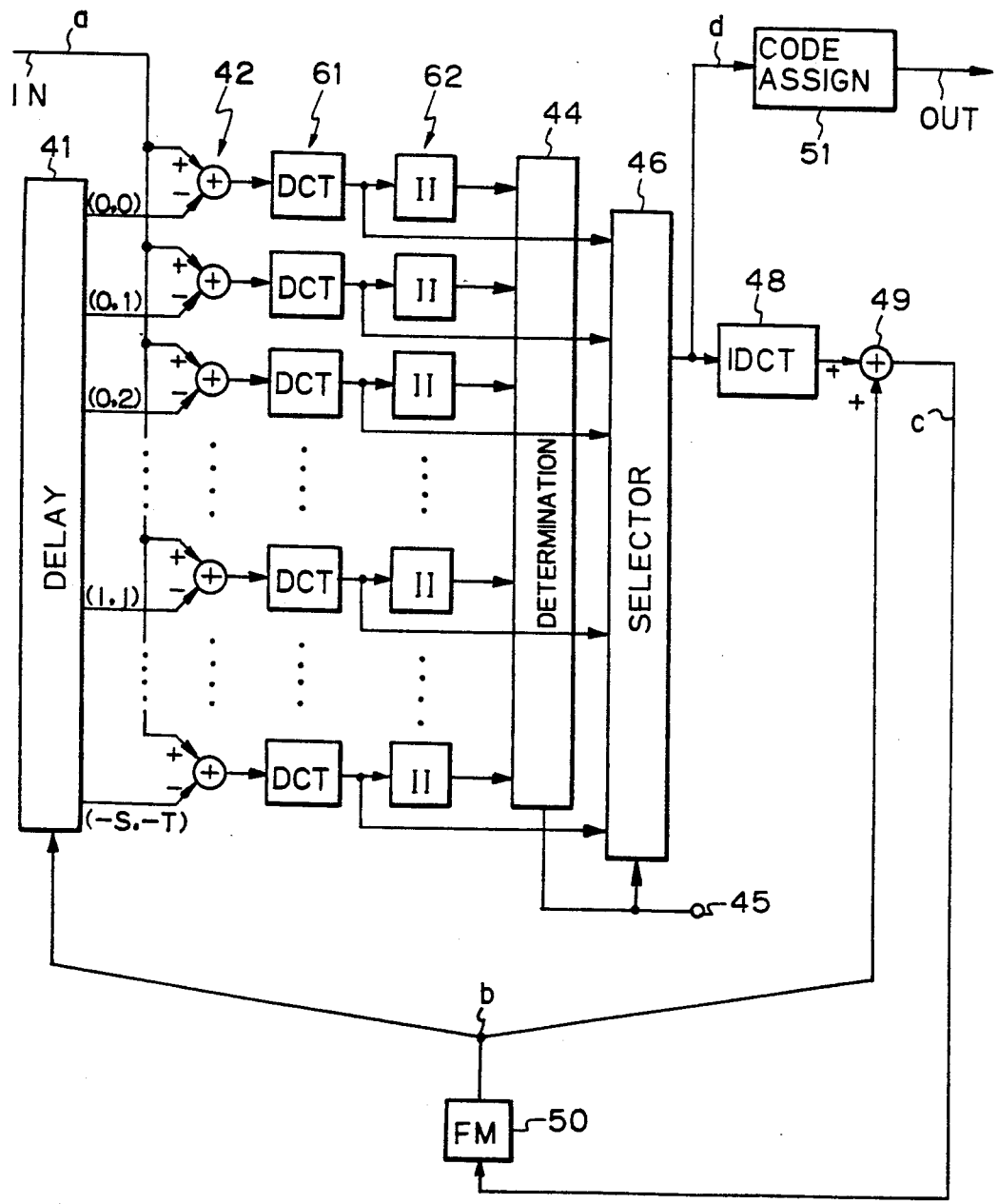
FIGS. 35 and 36 are block diagrams of a forth embodiment according to the present invention.

Now, another embodiment of band compression apparatus using a frame difference encoding method in combination with motion compensation will be described. FIG. 35 shows the construction of this embodiment where the transformation circuit 47 of the embodiment shown in FIG. 34 is disposed in the portion for detecting a motion vector (transformation circuit group 61). Thus, the overall construction shown in FIG. 35 is nearly the same as that shown in FIG. 34. The differences between them will be described in the following.

Although a data amount detection circuit denoted by II in FIG. 35 can be of the same construction as the power integration circuit PI shown in FIG. 34, it is adapted to detect the amount of data which has been band-compressed by DCT so as to perform the band compression more properly. For example, the amount of data is an integration of an absolute value, the number of data pieces which are not 0, "1" of each bit in binary notation, or the like. The output of the data amount detection circuit group 62 is supplied to a determination portion 44.

A transformation circuit denoted by DCT at least has a DCT. In combination with the DCT, the transformation circuit also may have a band compression technique such as a zigzag transformation which can be used along therewith. However, in this case, with an inverse transformation circuit, the inverted procedure should be performed.

The construction shown in FIG. 35 can compensate the motion vectors more suitably for band compression than that shown in FIG. 34.

Figure 36:
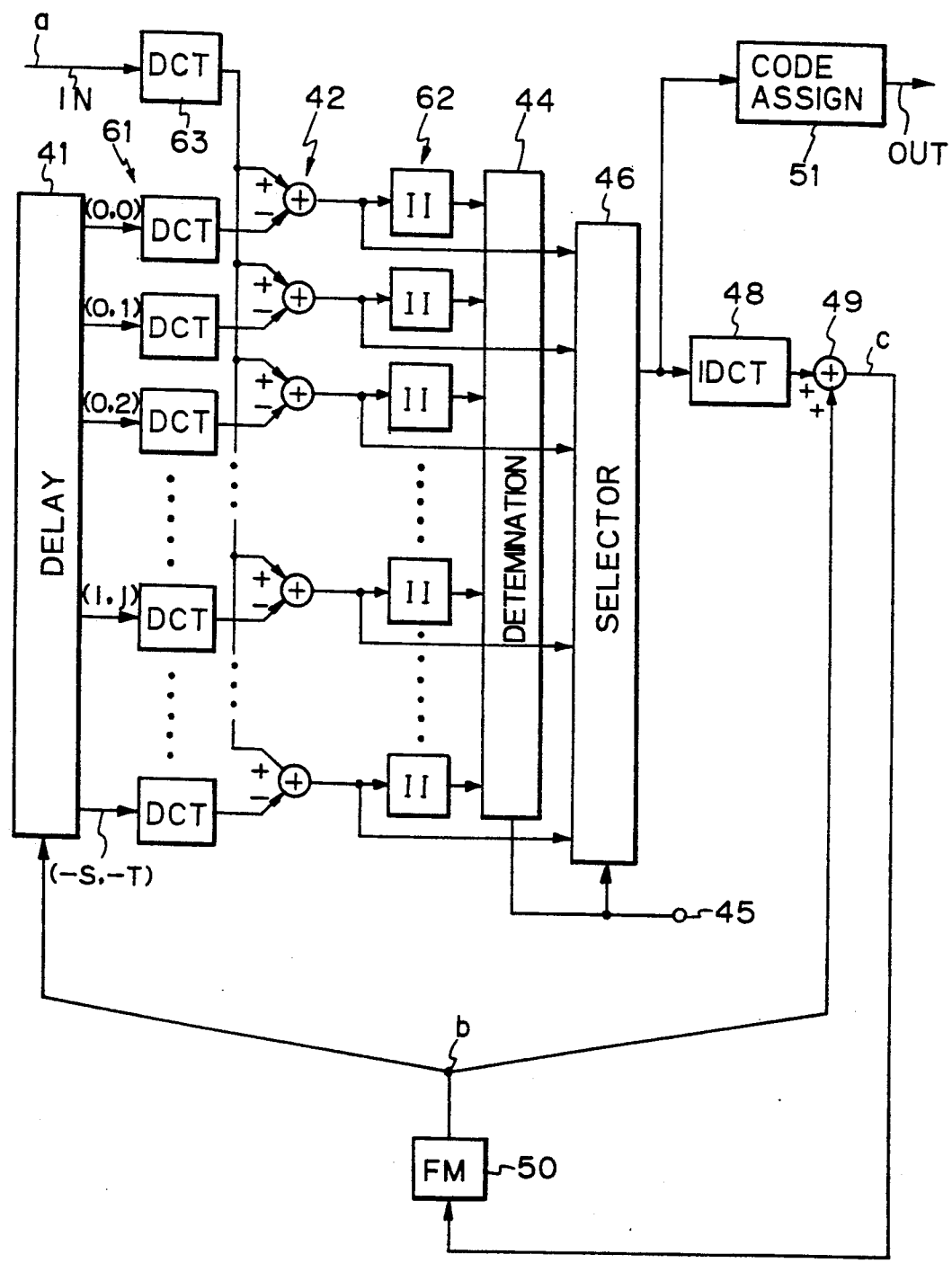

The DCT used in the construction shown in FIG. 35 performs a linear calculation, namely, interpolation calculation (matrix calculation). Thus, the result is the same regardless of whether the frame difference has been obtained. It should be apparent that the construction shown in FIG. 35 can be modified as shown in FIG. 36. The transformation circuit group shown in FIG. 36 is disposed at a position closer to the delay portion than that shown in FIG. 35.

When the transformation circuit group 61 is disposed in the motion vector detection circuit as shown in FIGS. 35 and 36, the calculation amount of the DCT disadvantageously increases. However, it does not become a burden to the hardware because of the following reason.

Figures 37, 40A, 40B, 40C:
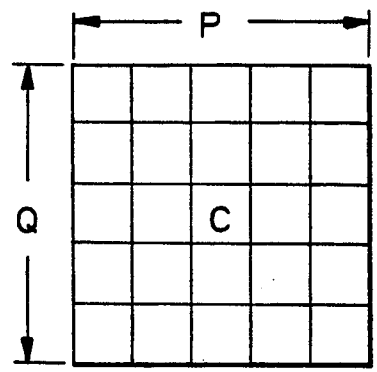
FIGS. 37, 38, 39, and 40A-C are schematic diagrams describing the forth embodiment according to the present invention.

As was described earlier, a picture is block segmented with P picture elements by Q picture elements in the horizontal direction and the vertical direction, respectively, as shown in FIG. 37. In this example, it is assumed that P=5 and Q=5. In addition, it is assumed that a motion vector is in the range where the block is deviated for ±S picture elements and ±T picture elements in the horizontal direction and the vertical direction, respectively. It is assumed that S=4 and T=3.

Figure 38:
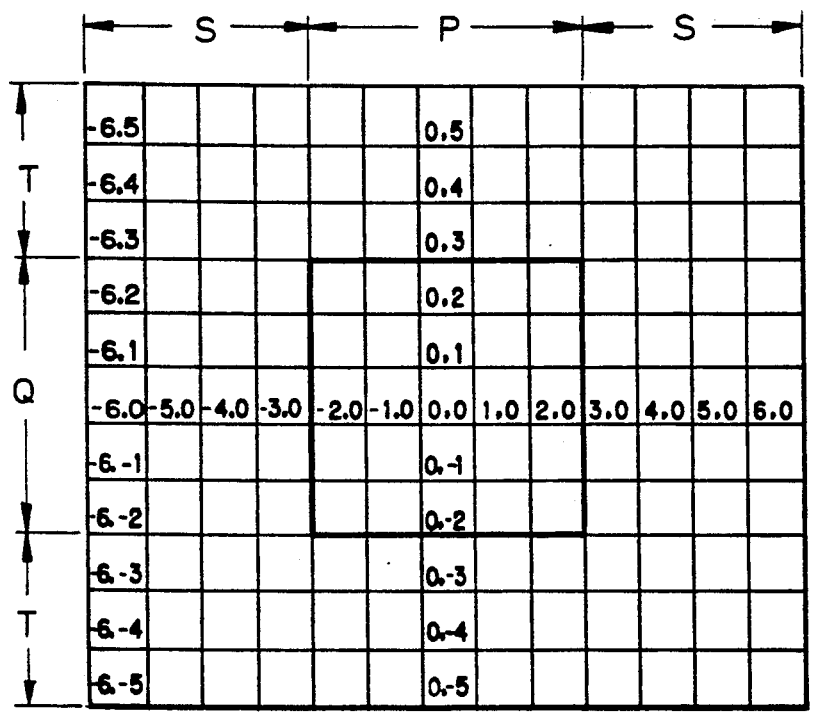

Thus, when the block of P picture elements by Q picture elements of the current frame is represented by the inner solid line shown in FIG. 38, an outer solid line shown in the figure is the range of picture elements of the preceding frame which is used in comparing the blocks. In the figure, the coordinates of each picture element are shown with the center which is positioned at coordinates 0, 0 (x=0, y=0). However, the coordinates of most of the picture elements are omitted in the figure.

(1) (Vertical)

For example, now consider the case where one frame is deviated for 4 picture elements in the horizontal direction from the left to the right and for 3 picture elements in the vertical direction from the top to the bottom. The block of the current frame which is the box represented by the inner solid line of FIG. 38 is compared to the block of the preceding frame of P picture elements × Q picture elements of the box represented by the solid line shown in FIG. 39. In other words, a block with coordinates as shown in FIG. 40A is used as the block of the preceding frame.

Figure 39:
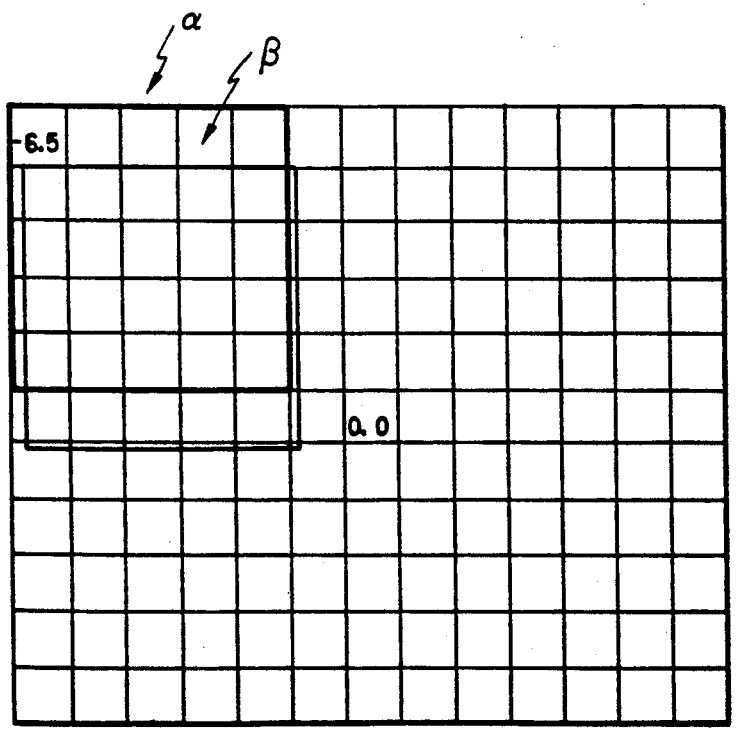

When blocks are compared in the case where one frame is deviated for 4 picture elements in the horizontal direction from left to right and for 2 picture elements in the vertical direction from the top to bottom, a block $\beta$ represented by a solid line shown in FIG. 39 is compared to the present block. In other words, a block with coordinates shown in FIG. 40B is used as the block of the preceding frame.

When blocks are compared in the case where the present frame is not deviated in the horizontal direction, but is deviated in the vertical direction, it is necessary to consider the following.

In the comparison between the DCT of $\alpha$ and that of $\beta$, the following results will appear. Although the DCT is performed two-dimensionally, a block is transformed in the horizontal direction and then in the vertical direction. A 5-line picture element group which is transformed in the horizontal direction of $\alpha$ shown in FIG. 40A is transformed in the horizontal direction of $\alpha$.

A 5-line picture element group shown in FIG. 40B denoted by reference numeral 68, overlaps with the group shown in FIG. 40A for 4 lines. Thus, when the 4 lines have been calculated for $\alpha$, they need not be calculated again for $\alpha$.

In conclusion, in comparing blocks which are not deviated in the horizontal direction, but only in the vertical direction, calculations of their transformations in the horizontal direction can be omitted.

Now, consider the case where one frame is deviated by 3 picture elements in the horizontal direction from the left to the right and for 3 picture elements in the vertical direction from the top to the bottom. In this case, a block of the current frame which is an inner box represented by the solid line shown in FIG. 38 is compared to a block of the preceding frame which may be presented as the block (FIG. 39) $\alpha$ is deviated to the right for 1 picture element. In other words, a block with coordinates as shown in FIG. 40C is used. When the data block shown in FIG. 40C is compared that shown in FIG. 40A, four columns overlap and the former does not have data at the left end of the latter, while the latter does not have data at the right end of the former.

A method of Fourier transformation as described in Takeya Ankyoin et. al, "High Speed Solution for Overlapped Data" in "How To Use FFT", Sanpo-Shuppan, PP. 132-133 has been known. Thus, in the case where horizontal transformation of the two-dimensional DCT is first considered once the transformation of the data block $\alpha$ as shown in FIG. 40A has been calculated, as shown by reference numeral 69, the transformation of the block which is deviated to the right for 1 picture element can be obtained with a simple operation without new, redundant calculations for the transformation. Although the reference document deals with Fourier transformation, the theory can be also applied to cosine transformation.

Although only horizontal transformation of the two-dimensional DCT has been described, the above mentioned method can be extended to two dimensions and thereby remarkably decrease the amount of necessary calculations. Although the amount of calculation hardware shown in FIG. 35 is much larger than that shown in FIG. 34, the construction shown in FIG. 36 can markedly reduce the amount of necessary calculations. Thus, although the size of the hardware is increased, since the DCT is included in the motion vector control, a significant advantage takes place.

Figure 41:
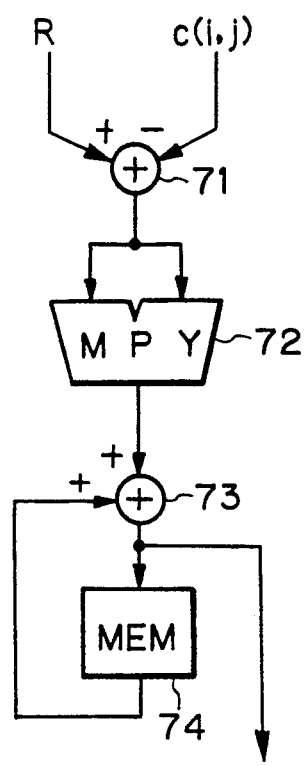
FIGS. 41 and 42 are block diagrams describing the fourth embodiment according to the present invention.
Figure 42:
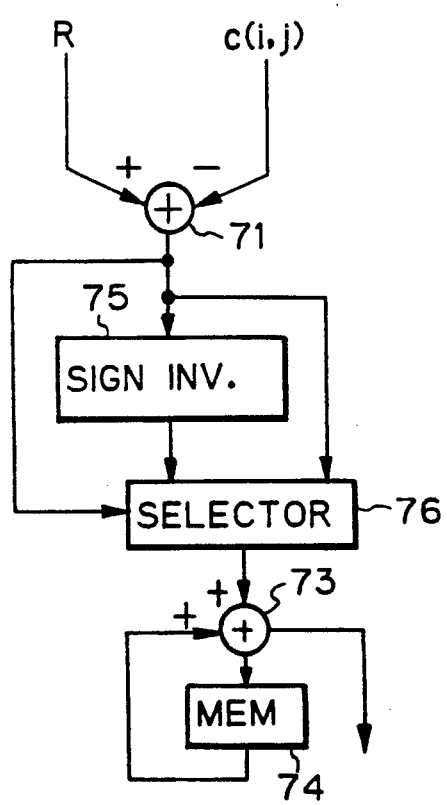

Now, a comparison of calculations carried out in the above mentioned constructions will be described. When the PI in FIG. 34 uses square integration, the construction thereof is represented by the circuit as shown in FIG. 41. In other words, an output of the subtraction circuit denoted by reference numeral 71 is squared by a multiplier 72. The squared output is cumulated by an addition circuit 73 and a memory 74. On the other hand, when absolute integration is performed, a circuit of the type shown in FIG. 42 is used. In other words, in FIG. 42, an output of a subtraction circuit denoted by reference numeral 71 is supplied to a sign inversion circuit 75 and a selector 76. The output of the selector 76 is cumulated. In integrating one block of $P \times Q$ picture elements of the current frame, calculations by $P \times Q$ times are performed and cumulated for $(2S+1) \times (2T+1)$. In total, calculations by $P \times Q \times (2S+1) \times (2T+1)$ times are required. For each picture element, calculations by $(2S+1) \times (2T+1)$ times are required.

The DCT can be calculated with a sum-of-products circuit. For each block of $P \times Q$ picture elements of the current frame, calculations by $P \times Q \times P^2Q$ times are required. Thus, for each picture element, calculations by P times are required.

In FIG. 36, the portion denoted by DCT only has the DCT. The data amount detection circuit II is the same as the power integration circuit PI. In this case, the calculations of the data amount detection circuit II are the same as those of the power integration circuit PI because the amount of data is not changed by the DCT.

When the DCT calculations are simply considered, since there are $\{(2S+1) \times (2T+1)+1\}$ DCTs in FIG. 36, for each picture element, a large number of calculations by $\{(2S+1) \times (2T+1)+1\equiv \times P$ times is required. However, as was described earlier, it is not necessary, to perform all of these calculations. Instead, only two DCT calculation circuits are needed at least for side a and side b. In other words, although two or more DCT calculation circuits used in FIG. 34 are required, the hardware thereof is within a practical size.

In addition, at the DCT output, the frequency of the data is analyzed as if the data passed through a filter bank. This is a new feature accomplished by the present invention.

For example, in band compression, some frequency components may be removed from the DCT output. Thus, the data amount detection circuit II, which is a power integration circuit, can omit the calculations for such frequency components. Thus, the number of calculations is decreased.

Since the DCT disposed at the input a knows each frequency component of the input data, it determines the DCT output and finds frequency components which are not necessary for the calculations implemented by the circuit II, thereby decreasing the number of calculations.

In addition, since high frequency components of a block do not markedly affect the detection of a motion vector, it is possible to limit the calculations of the data amount detection circuit II to frequency components in a low band.

Moreover, the method of decreasing the calculations for detecting motion vectors, which was described earlier and quoted from Kin Fuki, "3-Staged Detection Method", PP 203-204, "TV Picture Multi-Dimensional Signal Processing", Nikkan-Kogyo Shinbunsha can also be applied to the present invention.

Figure 43:
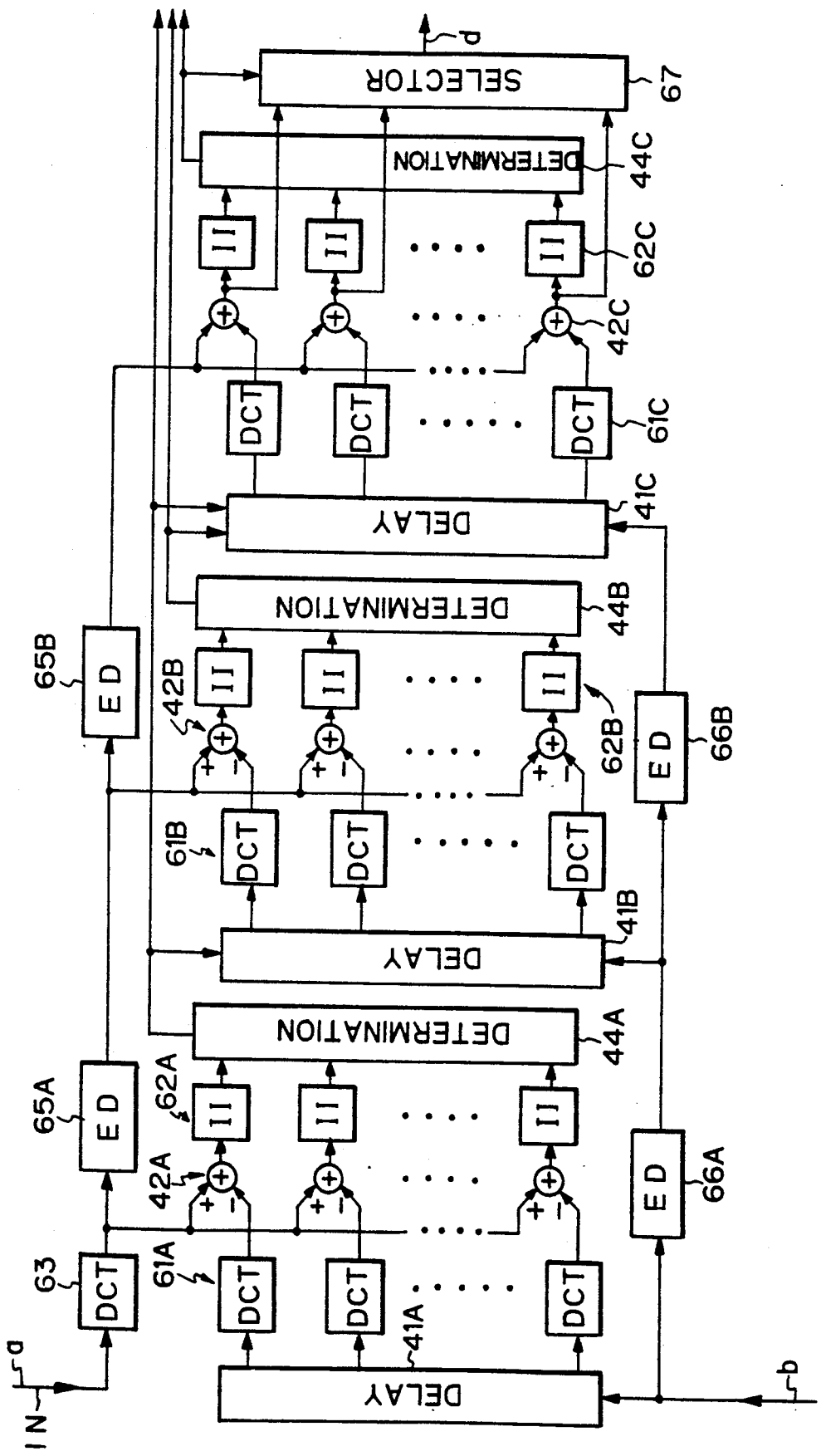
FIG. 43 is a block diagram of a fifth embodiment according to the present invention.

FIG. 43 shows an embodiment according to such a method. In the figure, nine positions are detected three times so as to limit the amount of deviation. FIG. 43 only shows the portions substituted from FIG. 36 in the range from the inputs a and b to the output d. A delay portion 41A shown in FIG. 43 is the same as other delay portions which have been already described. Delay portion 41A has only 9 taps. A delay portion 41B, which is basically the same as other delay portions, determines the delay amount of each tap in accordance with the most rough and minimum result obtained from the determination portion 41A. Likewise, a delay portion 41C assigns the delay amount for each tap in the range limited by the determination portion 44A and a determination portion 44B. Reference numerals 65A, 65B, 66A, and 66B denoted by ED1 to ED4 are equivalent delay circuits for matching the delay of the calculation portion.

The method of decreasing the calculation of the DCT which is not shown in the figure, but which has been already described can be applied to the present invention.

The apparatus according to the present invention can markedly decrease the memory capacity necessary for constructing a delay portion for detecting motion vectors, in particular, a delay portion for matching blocks and the memory capacity for performing cumulative operations, in comparison to the prior art. Thus, the entire scale of the motion vector detection apparatus can be decreased.

Since the apparatus according to the present invention can reduce two frame memories necessary for detecting a motion vector and for encoding an interframe encoding into one, the circuit scale can be decreased.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A motion vector detection apparatus including:
   delay means for receiving first horizontal scan raster picture data and for outputting a particular detection range of picture date;
   block comparison means for receiving second picture data exhibiting a predetermined time difference with respect to said first picture data and picture data supplied from said delay means and for detecting for each block formed of $P \times Q$ picture elements a difference between said picture data supplied from said delay means and said second picture data;
   and determination means responsive to an output signal from said block comparison means for determining a matching degree of pictures represented by said first and second picture data,
   said delay means comprising:
   scanning conversion means for converting input picture data from said horizontal scan raster into intra-block scan data and
   a plurality of shift registers for receiving one-frame delayed, converted first picture data, said plurality of shift registers being serially connected to form taps at respective outputs thereof, including a reference tap, said taps providing a first block of (P×Q) picture elements which are earlier than said reference tap and a second block which deviates by i picture elements horizontally and by j picture elements vertically from said first block, said second picture data being derived from a selected tap which is equal to the difference between each picture element of said second block and the reference tap when said first block does not deviate from said second block.

2. A motion vector detection apparatus including:

delay means for receiving first picture data and for outputting a particular detection range of picture data;

block comparison means for receiving second picture data exhibiting a predetermined time difference with respect to said first picture data and picture data supplied from said delay means and for detecting for each block formed of P×Q picture elements a difference between said picture data supplied from said delay means and said second picture data;

and determination means responsive to an output signal from said block comparison means for determining a matching degree of pictures represented by said first and second picture data, said determination means comprising:

means for receiving remainders from said block comparison means and for detecting a minimum value thereof;

means for allocating vectors which are physically adjacent to the detected minimum vector, for calculating correlation of said allocated vectors with a reference wave, and for generating an output having a value determined by the calculated correlation; and means responsive to the calculated correlation for detecting the minimum vector as a motion vector or for determining that a motion contour portion is present in a block.

3. The motion vector detector apparatus as set forth in claim 2 wherein said predetermined time difference is one field.

4. The motion vector detection apparatus as set forth in claim 2, wherein said predetermined time difference is one frame.

5. In a band compression apparatus formed of motion compensation means and inter-frame encoding means, the improvement comprising:

means for generating a difference between input picture data and second picture data exhibiting a time difference of one frame with respect to said input picture data;

means for segmenting said input picture data into blocks such that said input picture data and said second picture data include blocks of picture elements for use as comparison points;

means for detecting a matching degree of each block of said comparison points of said input picture data relative to said second picture data and thereby detect a motion vector in response to the highest matching degree; and means for selecting and encoding the difference between input picture data and second picture data in accordance with said detected motion vector.

6. In a band compression apparatus formed of motion compensation means and inter-frame encoding means, the improvement comprising:

delay means for generating picture data representing a current frame and picture data representing a preceding frame;

means for providing an encoded orthogonal conversion of the picture data representing said preceding frame;

means for forming a difference between the picture data representing said current frame and a decoded orthogonal conversion of the picture data representing said preceding frame; and means for detecting a position of said current frame relative to said preceding frame which has the highest effect of the data compression from said difference and for selectively outputting the difference of the detected position.

* * * * *